United States Patent [19]

Athas et al.

[11] 3,922,499

[45] Nov. 25, 1975

[54] COMMUNICATION SWITCHING SYSTEM NETWORK CONTROL ARRANGEMENT

[75] Inventors: Gregory R. Athas, Hanover Park; Johannes Draayer, Wheaton; William F. Malfese, Medinah; Nigel J. E. Reynolds, Elk Grove Village; George W. Potenza, Western Springs, all of Ill.

[73] Assignee: GTE Automatic Electric Laboratories Incorporated, Northlake, Ill.

[22] Filed: Sept. 14, 1973

[21] Appl. No.: 397,453

[52] U.S. Cl. .......... 179/18 GE

[51] Int. Cl.² .......... H04Q 3/42

[58] Field of Search ... 179/18 GE, 175.2 D, 175.21, 179/175.23, 175.2 R

[56] References Cited

UNITED STATES PATENTS

| | | | |
|---|---|---|---|
| 3,349,189 | 10/1967 | Van Bosse | 179/18 GE |
| 3,351,721 | 11/1967 | Voegtlen et al. | 179/175.21 |
| 3,588,386 | 6/1971 | Draayer | 179/175.21 |
| 3,626,383 | 12/1971 | Oswald et al. | 340/172.5 |
| 3,660,600 | 5/1972 | Lee, Jr. | 179/18 EA |
| 3,748,390 | 7/1973 | Gueldenpfennig et al. | 179/18 GE |
| 3,829,627 | 8/1974 | Short et al. | 179/175.2 D |

*Primary Examiner*—Thomas W. Brown

[57] ABSTRACT

A network control arrangement for a communication switching system having a group of switching network units each having a plurality of inlets and a plurality of outlets and having a plurality of switching devices for closing paths coupling inlets and outlets, each one of the devices having control elements for causing the paths to be closed when energized in response to common control equipment for causing selectively the activation of the control elements to establish paths through the network units, includes a circuit coupling together corresponding ones of the control elements of the network units so that corresponding ones of the control elements can be energized simultaneously, a distributor for selecting one of the control elements to permit it to be activated, and a switching circuit for coupling selectively each one of the control elements of a selected network unit to the distributor so that it can permit the selected control element to be activated.

1 Claim, 36 Drawing Figures

FIG. 20

NC DECODERS
INPUT-OUTPUT ASSIGNMENTS

| IMPLEMENTED NCWØ BITS FOR DECODER INPUTS | DECODER NAME | DECODER OUTPUTS / INPUTS | DECODER OUTPUT ASSIGNMENT |
|---|---|---|---|
| BIT 5 - BIT 9 | A-MATRIX HORIZONTAL TERMINAL NUMBER DECODER (AHND) | 32 / 5 | AHNDØØ-AHND37 (OCTAL) |
| BIT 10 - BIT 12 | A-MATRIX NUMBER DECODER (AMND) | 8 / 3 | AMNDØ - AMND7 |
| BIT 13 - BIT 15 | TRUNK GRID NUMBER DECODER (TGND) | 8 / 3 | TGNDØ - TGND 7 |
| BIT 16 - BIT 18 | LINK NUMBER DECODER (LKND) | 8/3 | LKNDØ - LKND 7 |
| BIT 22 - BIT 25 | D-MATRIX HORIZONTAL TERMINAL NUMBER DECODER (DHND) | 16 / 4 | DHNDØØ-DHND17 (OCTAL) |
| BIT 26 - BIT 28 | D-MATRIX NUMBER DECODER (DMND) | 8/3 | DMNDØ - DMND 7 |
| BIT 29 - BIT 31 | POSITION GRID NUMBER DECODER (PGND) | 8/3 | PGNDØ - PGND 7 |

FIG. 21

OPERATIONAL CRITERIA
NC SUPPLY & GROUND GATES

| TYPE OF GATE | LOGIC INPUT | ANALOG OUTPUT |
|---|---|---|
| GQ | Ø | GROUND POTENTIAL |
| | I | OPEN CIRCUIT |
| SQ | I | -48 VOLTS |
| | Ø | OPEN CIRCUIT |
| FQ | I | -48 VOLTS |
| | Ø | OPEN CIRCUIT |

FIG. 23

SENSE CRITERIA
VOLTAGE SENSORS

| TYPE OF SENSOR | ANALOG INPUT | LOGIC OUTPUT |
|---|---|---|
| SV | -54 VOLTS < V < -33 VOLTS | I |
| | V > -33 VOLTS (INCLUDING OPEN CKT.) | Ø |
| GV | -54 VOLTS < V < -33 VOLTS | I |
| | V > -33 VOLTS (INCLUDING GRD. OR OPEN CKT.) | Ø |
| TV | -54 VOLTS < V < -33 VOLTS | I |
| | V > -33 VOLTS (INCLUDING OPEN CKT.) | Ø |

FIG. 24

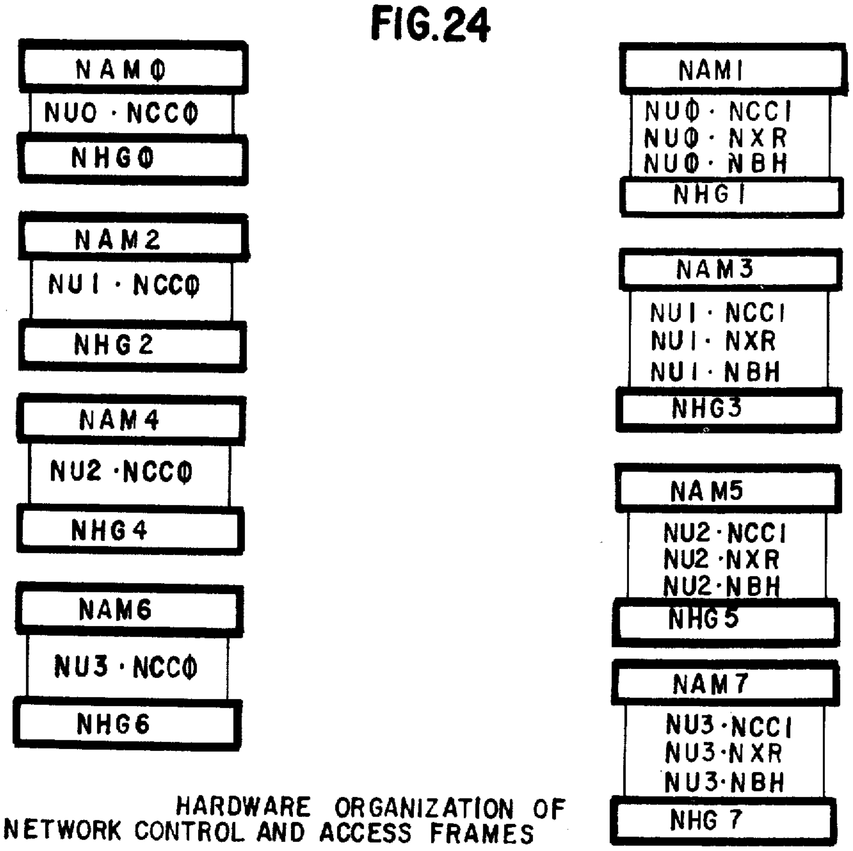

HARDWARE ORGANIZATION OF
NETWORK CONTROL AND ACCESS FRAMES

| LOGIC INPUT CONDITIONS | | | AMSQØØ – AMSQ37 | BMSQØ – BMSQ7 | CMSQØ – CMSQ7 | DMSQØØ – DMSQ17 | AMGQØ – AMGQ7 | BMGQØ – BMGQ7 | CMGQØ – CMGQ7 | DMGQØ – DMGQ7 | ABRSQØ – ABRSQ7 | BCRSQØ – BCRSQ7 | CBRSQØ – CBRSQ7 | DCRSQØ – DCRSQ7 | ABRGQØ – ABRGQ7 | BCRGQØ – BCRGQ7 | CBRGQØ – CBRGQ7 | DCRGQØ – DCRGQ7 | ABTFQ | BCTFQ | DCTFQ | AMGFQ | BMGFQ | CMGFQ | DMGFQ | ABRGFQ | BCRGFQ | CBRGFQ | DCRGFQ |
|---|---|---|---|---|---|---|---|---|---|---|---|---|---|---|---|---|---|---|---|---|---|---|---|---|---|---|---|---|---|
| DECODER OUTPUTS | | LKNDØ - LKND7 | | | | | X | X | X | X | | | | | | | | | | | | | | | | | | | |
| DECODER OUTPUTS | | DHNDØØ - DHND17 | | | | X | | | | | | | | | | | | | | | | | | | | | | | |
| DECODER OUTPUTS | | DMNDØ - DMND7 | | | X | | | | | | | | | X | | | | | | | | | | | | | | | |
| DECODER OUTPUTS | | PGNDØ - PGND7 | | | | | | | | | | X | | | | | X | X | | | | | | | | | | | |
| DECODER OUTPUTS | | AHNDØØ - AHND37 | X | | | | | | | | | | | | | | | | | | | | | | | | | | |
| DECODER OUTPUTS | | AMNDØ - AMND7 | | X | | | | | | | X | | | | | | | | | | | | | | | | | | |
| DECODER OUTPUTS | | TGNDØ - TGND7 | | | | | | | | | | | X | | X | X | | | | | | | | | | | | | |
| COMMANDS | | ERGF | | | | | | | | | | | | | | | | | | | | | | | | X | X | X | X |
| COMMANDS | | EMGF | | | | | | | | | | | | | | | | | | | | X | X | X | X | | | | |
| COMMANDS | | ETF | | | | | | | | | | | | | | | | | X | X | X | | | | | | | | |
| COMMANDS | | EBCTF | | | | | | | | | | | | | | | | | | X | | | | | | | | | |
| COMMANDS | EMG GROUP | EDMG | | | | | | | | X | | | | | | | | | | | | | | | | | | | |
| COMMANDS | EMG GROUP | ECMG | | | | | | | X | | | | | | | | | | | | | | | | | | | | |
| COMMANDS | EMG GROUP | EBMG | | | | | | X | | | | | | | | | | | | | | | | | | | | | |
| COMMANDS | EMG GROUP | EAMG | | | | | X | | | | | | | | | | | | | | | | | | | | | | |
| COMMANDS | | EMS | X | X | X | X | | | | | | | | | | | | | | | | | | | | | | | |
| COMMANDS | | ERG | | | | | | | | | | | | | X | X | X | X | | | | | | | | | | | |
| COMMANDS | | ERS | | | | | | | | | X | X | X | X | | | | | | | | | | | | | | | |

FIG. 22

GATE SELECTION LOGIC

FIG.31

NOTE: HR (HRN) = HR (PGN.DMN.DHN)

| | PGØ | PG1 | PG2 | PG3 | NAM0 |
|---|---|---|---|---|---|
| DH00 | HR0000·HR0700 | HR1ØØØ·HR17ØØ | HR2ØØØ·HR 27ØØ | HR3ØØØ·HR37ØØ | WØØ |
| DH01 | HR0001·HR0701 | HR1ØØ1·HR17Ø1 | HR2ØØ1·HR27Ø1 | HR3ØØ1·HR37Ø1 | WØ1 |
| DH02 | HR0002·HR0702 | HR1ØØ2·HR17Ø2 | HR2ØØ2·HR27Ø2 | HR3ØØ2·HR37Ø2 | WØ2 |
| DH03 | HR0003·HR0703 | HR1ØØ3·HR17Ø3 | HR2ØØ3·HR27Ø3 | HR3ØØ3·HR37Ø3 | WØ3 |
| | Ø 7 | 8 15 | 16 23 | 24 31 | CMPN |
| | DMØ - DM7 | DMØ - DM7 | DMØ - DM7 | DMØ - DM7 | |

| | PG4 | PG5 | PG6 | PG7 | NAM1 |
|---|---|---|---|---|---|
| DHØØ | HR4ØØØ·HR47ØØ | HR5ØØØ·HR57ØØ | HR6ØØØ·HR67ØØ | HR7ØØØ·HR77ØØ | WØØ |
| DHØ1 | HR4ØØ1·HR47Ø1 | HR5ØØ1·HR57Ø1 | HR6ØØ1·HR67Ø1 | HR7ØØ1·HR77Ø1 | WØ1 |
| DHØ2 | HR4ØØ2·HR47Ø2 | HR5ØØ2·HR57Ø2 | HR6ØØ2·HR67Ø2 | HR7ØØ2·HR77Ø2 | WØ2 |
| DHØ3 | HR4ØØ3·HR47Ø3 | HR5ØØ3·HR57Ø3 | HR6ØØ3·HR67Ø3 | HR7ØØ3·HR77Ø3 | WØ3 |
| | Ø 7 | 8 15 | 16 23 | 24 31 | CMPN |
| | DMØ - DM7 | DMØ - DM7 | DMØ - DM7 | DMØ DM7 | |

| | PGØ | PG1 | PG2 | PG3 | NAM2 |
|---|---|---|---|---|---|
| DH04 | HRØØØ4·HRØ7Ø4 | HR1ØØ4·HR17Ø4 | HR2ØØ4·HR27Ø4 | HR3ØØ4·HR37Ø4 | WØØ |
| DH05 | HRØØØ5·HRØ7Ø5 | HR1ØØ5·HR17Ø5 | HR2ØØ5·HR27Ø5 | HR3ØØ5·HR37Ø5 | WØ1 |
| DH06 | HRØØØ6·HRØ7Ø6 | HR1ØØ6·HR17Ø6 | HR2ØØ6·HR27Ø6 | HR3ØØ6·HR37Ø6 | WØ2 |
| DHØ7 | HRØØØ7·HRØ7Ø7 | HR1ØØ7·HR17Ø7 | HR2ØØ7·HR27Ø7 | HR3ØØ7·HR37Ø7 | WØ3 |
| | Ø 7 | 8 15 | 16 23 | 24 31 | CMPN |
| | DMØ - DM7 | DMØ - DM7 | DMØ DM7 | DMØ DM7 | |

| | PG4 | PG5 | PG6 | PG7 | NAM3 |
|---|---|---|---|---|---|
| DHØ4 | HR4ØØ4·HR47Ø4 | HR5ØØ4·HR57Ø4 | HR6ØØ4·HR67Ø4 | HR7ØØ4·HR77Ø4 | WØØ |
| DHØ5 | HR4ØØ5·HR47Ø4 | HR5ØØ5·HR57Ø5 | HR6ØØ5·HR67Ø5 | HR7ØØ5·HR77Ø5 | WØ1 |
| DHØ6 | HR4ØØ6·HR47Ø5 | HR5ØØ6·HR57Ø6 | HR6ØØ6·HR67Ø6 | HR7ØØ6·HR77Ø6 | WØ2 |
| DHØ7 | HR4ØØ7·HR47Ø6 | HR5ØØ7·HR57Ø7 | HR6ØØ7·HR67Ø7 | HR7ØØ7·HR77Ø7 | WØ3 |
| | Ø 7 | 8 15 | 16 23 | 24 31 | CMPN |
| | DMØ - DM7 | DMØ - DM7 | DMØ - DM7 | DMØ - DM7 | |

| | PGØ | PG1 | PG2 | PG3 | NAM4 |
|---|---|---|---|---|---|
| DH1Ø | HRØØ1Ø·HRØ71Ø | HR1Ø1Ø·HR171Ø | HR2Ø1Ø·HR271Ø | HR3Ø1Ø·HR371Ø | WØØ |
| DH11 | HRØØ11·HRØ711 | HR1Ø11·HR1711 | HR2Ø11·HR2711 | HR3Ø11·HR3711 | WØ1 |
| DH12 | HRØØ12·HRØ712 | HR1Ø12·HR1712 | HR2Ø12·HR2712 | HR3Ø12·HR3712 | WØ2 |
| DH13 | HRØØ13·HRØ713 | HR1Ø13·HR1713 | HR2Ø13·HR2713 | HR3Ø13·HR3713 | WØ3 |
| | Ø 7 | 8 15 | 16 23 | 24 31 | CMPN |
| | DMO - DM7 | DMØ - DM7 | DMØ - DM7 | DMØ - DM7 | |

| | PG4 | PG5 | PG6 | PG7 | NAM5 |
|---|---|---|---|---|---|
| DH1Ø | HR4Ø1Ø·HR471Ø | HR5Ø1Ø·HR571Ø | HR6Ø1Ø·HR671Ø | HR7Ø1Ø·HR771Ø | WØØ |
| DH11 | HR4Ø11·HR4711 | HR5Ø11·HR5711 | HR6Ø11·HR6711 | HR7Ø11·HR7711 | WØ1 |
| DH12 | HR4Ø12·HR4712 | HR5Ø12·HR5712 | HR6Ø12·HR6712 | HR7Ø12·HR7712 | WØ2 |
| DH13 | HR4Ø13·HR4713 | HR5Ø13·HR5713 | HR6Ø13·HR6713 | HR7Ø13·HR7713 | WØ3 |
| | Ø 7 | 8 15 | 16 23 | 24 31 | CMPN |
| | DMØ - DM7 | DMØ - DM7 | DMØ - DM7 | DMØ - DM7 | |

| | PGØ | PG1 | FG2 | PG3 | NAM6 |
|---|---|---|---|---|---|
| DH14 | HRØØ14·HRØ714 | HR1Ø14·HR1714 | HR2Ø14·HR2714 | HR3Ø14·HR3714 | WØØ |
| DH15 | HRØØ15·HRØ715 | HR1Ø15·HR1715 | HR2Ø15·HR2715 | HR3Ø15·HR3715 | WØ1 |
| DH16 | HRØØ16·HRØ716 | HR1Ø16·HR1716 | HR2Ø16·HR2716 | HR3Ø16·HR3716 | WØ2 |
| DH17 | HRØØ17·HRØ717 | HR1Ø17·HR1717 | HR2Ø17·HR2717 | HR3Ø17·HR3717 | WØ3 |
| | Ø 7 | 8 15 | 16 23 | 24 31 | CMPN |
| | DMØ - DM7 | DMØ - DM7 | DMØ - DM7 | DMØ - DM7 | |

| | PG4 | PG5 | PG6 | PG7 | NAM7 |
|---|---|---|---|---|---|
| DH14 | HR4Ø14·HR4714 | HR5Ø14·HR5714 | HR6Ø14·HR6714 | HR7Ø14-HR7714 | WØØ |
| DH15 | HR4Ø15·HR4715 | HR5Ø15·HR5715 | HR6Ø15·HR6715 | HR7Ø15-HR7715 | WØ1 |
| DH16 | HR4Ø16·HR4716 | HR5Ø16·HR5716 | HR6Ø16·HR6716 | HR7Ø16-HR7716 | WØ2 |
| DH17 | HR4Ø17·HR4717 | HR5Ø17·HR5717 | HR6Ø17·HR6717 | HR7Ø17-HR7717 | WØ3 |
| | Ø 7 | 8 15 | 16 23 | 24 31 | CMPN |
| | DMØ - DM7 | DMØ - DM7 | DMØ - DM7 | DMØ - DM7 | |

COMMUNICATION SWITCHING SYSTEM NETWORK CONTROL ARRANGEMENT

BACKGROUND OF THE INVENTION

1. Field of the Invention

This invention relates to a common control switching system network control arrangement, and it more particularly relates to a control arrangement for establishing paths through switching networks in response to common control equipment.

2. Description of the Prior Art

Communication switching systems, such as electronic telephone switching systems, have employed a series of cascaded switching networks for establishing paths selectively therethrough in response to common control equipment. Each one of the switching networks is usually arranged in a grid or matrix of switching elements, such as reed relays, and the cross-point relays are initially energized or pulled by separate leads, which are selected by means of a relay tree. In this regard, the common control equipment establishes a connection through the relay tree to the pull windings of the relays to be energized, and then the appropriate potentials are applied for initially operating the desired relays and then holding them operated by hold windings associated therewith.

However, while such a relay-tree control arrangement is suitable for some applications, failures of the large number of contacts, arranged in groups of series-connected contacts to form the relay tree, are not readily detectable, since the contacts may either remain closed or remain open and thus a continuity check would not isolate given faulty contacts. Any type of fault detection equipment would be necessarily cumbersome and impractical from an economics standpoint. Therefore, it would be highly desirable to provide a network control arrangement which would facilitate fast and efficient failure detection and localization of faulty circuit elements, while employing only a small number of hardware circuits and being capable of efficient installation without undue and excessive testing operations and with fast and efficient maintenance procedures thereafter.

SUMMARY OF THE INVENTION

The object of this invention is to provide a new and improved common control communication switching system network control arrangement, which facilitates fast and efficient failure detection and localization of faulty circuit elements with a relatively small number of circuits.

Briefly, the above and further objects are realized in accordance with the present invention by providing a network control arrangement including circuits coupling together corresponding ones of the control elements of the switching devices so that corresponding ones of the control elements can be energized simultaneously, a distributor for selecting one of the control elements of the network units to activate selected switching devices, and a switching circuit for coupling selectively each one of the control elements of selected network units to the distributor so that it can permit the selected control element to be activated. Thus, the control or pull elements for the switching devices are selected without the need for complex relay trees having many contacts in series to facilitate fault detections and to simplify and thus render less expensive the circuitry involved. Other features of the present invention relate to the switching circuit which also connects test equipment to hold elements for the switching devices.

CROSS-REFERENCES TO RELATED APPLICATIONS AND PUBLICATIONS AND TO INVENTIONS DISCLOSED HEREIN

The system in which the present invention is incorporated is disclosed in an article entitled "IMPROVED EFFICIENCY IN TOLL HANDLING WITH TSPS (TRAFFIC SERVICE POSITION SYSTEM)" by W. D. Wilson in "Automatic Electric Technical Journal", Vol. 12, No. 7, dated July, 1971. The common control equipment for the system in which the arrangement of the present invention is incorporated is disclosed in U.S. patent application Ser. No. 289,718, filed Sept. 15, 1972 now U.S. Pat. No. 3,818,455, entitled "CONTROL COMPLEX FOR TSPS TELEPHONE SYSTEM" by E. F. Brenski et al., hereinafter referred to as COMMON CONTROL patent application. The peripheral unit complex including the network access matrix unit is disclosed in U.S. patent application Ser. No. 397,456, filed Sept. 14, 1973, entitled "PERIPHERAL CONTROL UNIT FOR A COMMUNICATION SWITCHING SYSTEM" by E. F. Brenski et al.

In addition to the invention claimed herein, there is disclosed several other inventions relating to the network sub-system and its interface with other sub-systems of the TSPS switching system, by inventive entities including one or more of the following and possibly others: N. R. Brown, R. R. Reed and F. A. Risky. These inventions may include, but are not limited to, network bypass table, method for finding faulty cross-points, peripheral controller, audio path testing, and trunk highway arrangement. These inventions were disclosed to the Applicants during the design of the network complex, and are included herein as part of the disclosure of this sub-system.

DESCRIPTION OF THE DRAWINGS

FIGS. 6 through 31 are detailed block diagrams of the network complex of the present invention.

DESCRIPTION OF THE PREFERRED EMBODIMENT

Figure 5:
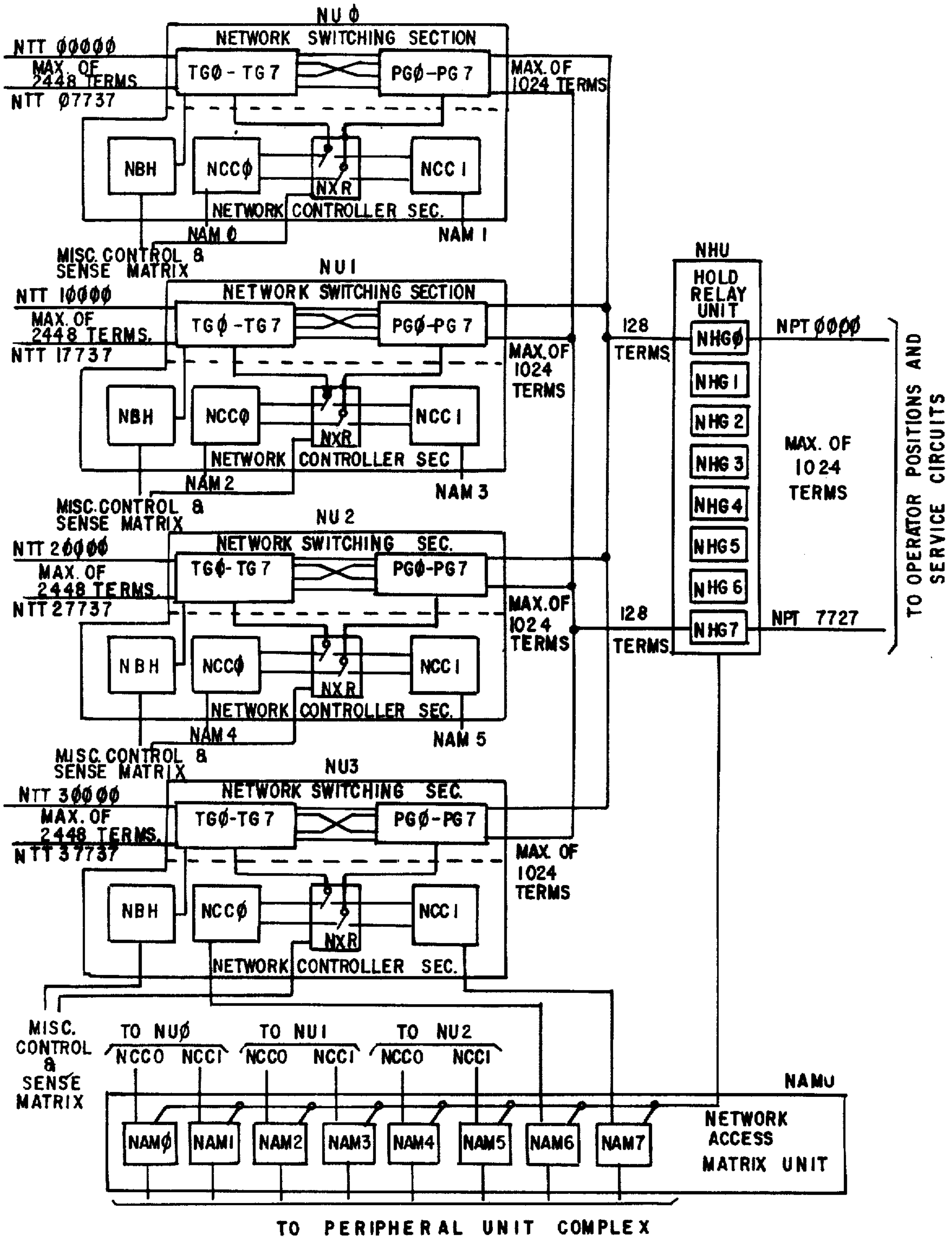
FIG. 5 is a block diagram of the network complex including the network access matrix unit.

The system is disclosed in the foregoing-mentioned publication and patent application incorporated herein and made a part hereof by reference, and as hereinafter described in greater detail, the communication switching system in which the network control arrangement of the present invention is incorporated is a traffic service position system TSPS which is a programmed-control system for interconnecting trunk circuits with operator position and service circuits. As best seen in FIG. 5, the network complex for the TSPS system includes four network units NUØ through NU3 for connecting the trunk circuits through the hold relay units NHU to the position and service circuits. Each one of the network units comprises a network switching section, having trunk grid matrices TGØ through TG7 connected to the trunk circuits and interconnected therewith position grid matrices PGØ through PG7, which section is controlled by one of a duplicated pair of network controllers NCCØ or NCC1 which are connected in an active or standby condition by means of a network transfer relay circuit NXR. The audio testing hold path battery disconnect circuit NBH is provided for audio path testing purpose and the network controllers NCCØ and NCC1 are controlled by the network access matrix unit, which is a group of sense points and control points as hereinafter described in greater detail, which points communicate with the common control via its peripheral controllers.

Figure 3:
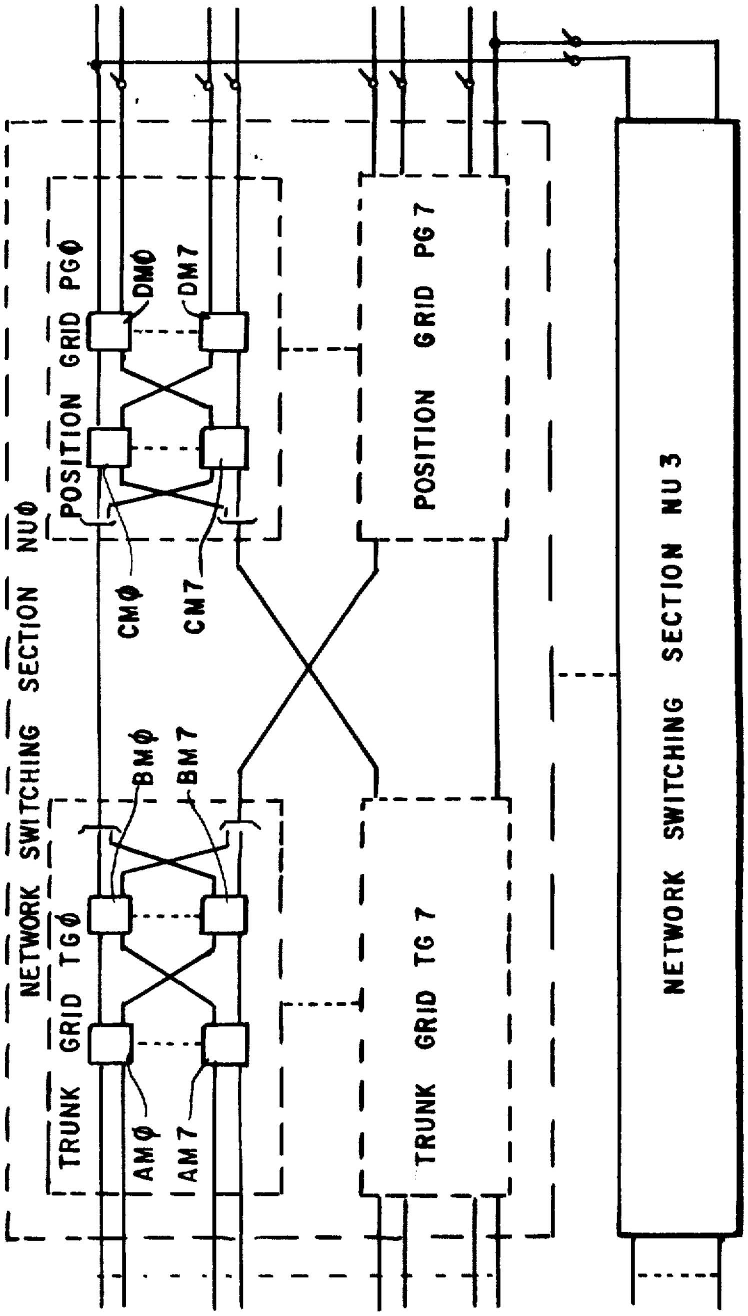
FIG. 3 is a block diagram of the network switching section showing the audio and hold path interconnections.

As shown in FIG. 3, the network switching section of each one of the network units, such as the network switching section of the network unit NUØ, includes eight trunk grids TGØ through TG7 and eight position grids PGØ through PG7. Each one of the trunk grids, such as the trunk grid TGØ, comprises eight A matrices AMØ through AM7 and eight B matrices BMØ through BM7. Similarly, each one of the position grids, such as the position grid PGØ, comprises eight C matrices CMØ through CM7 and eight D matrices DMØ through DM7. In the A stage, each one of the outlets of the eight A matrices is connected to a different one of the inlets of the eight B matrices, and the outlets of the B matrices are connected to the inlets of all eight position grids. The interconnections of the C and D matrices of the position grids are similar to the interconnections between the A and B matrices. The outlets of the D matrices of the network switching units are multipled together with the other three network switching units in the preferred embodiment of the present invention for traffic purposes. The inlets to the A matrices may range anywhere from eight to 32 and the outlets of the B matrices and the inlets to the C matrices are always eight in number. The outlets of the D matrices range from four to 16.

Figure 1:
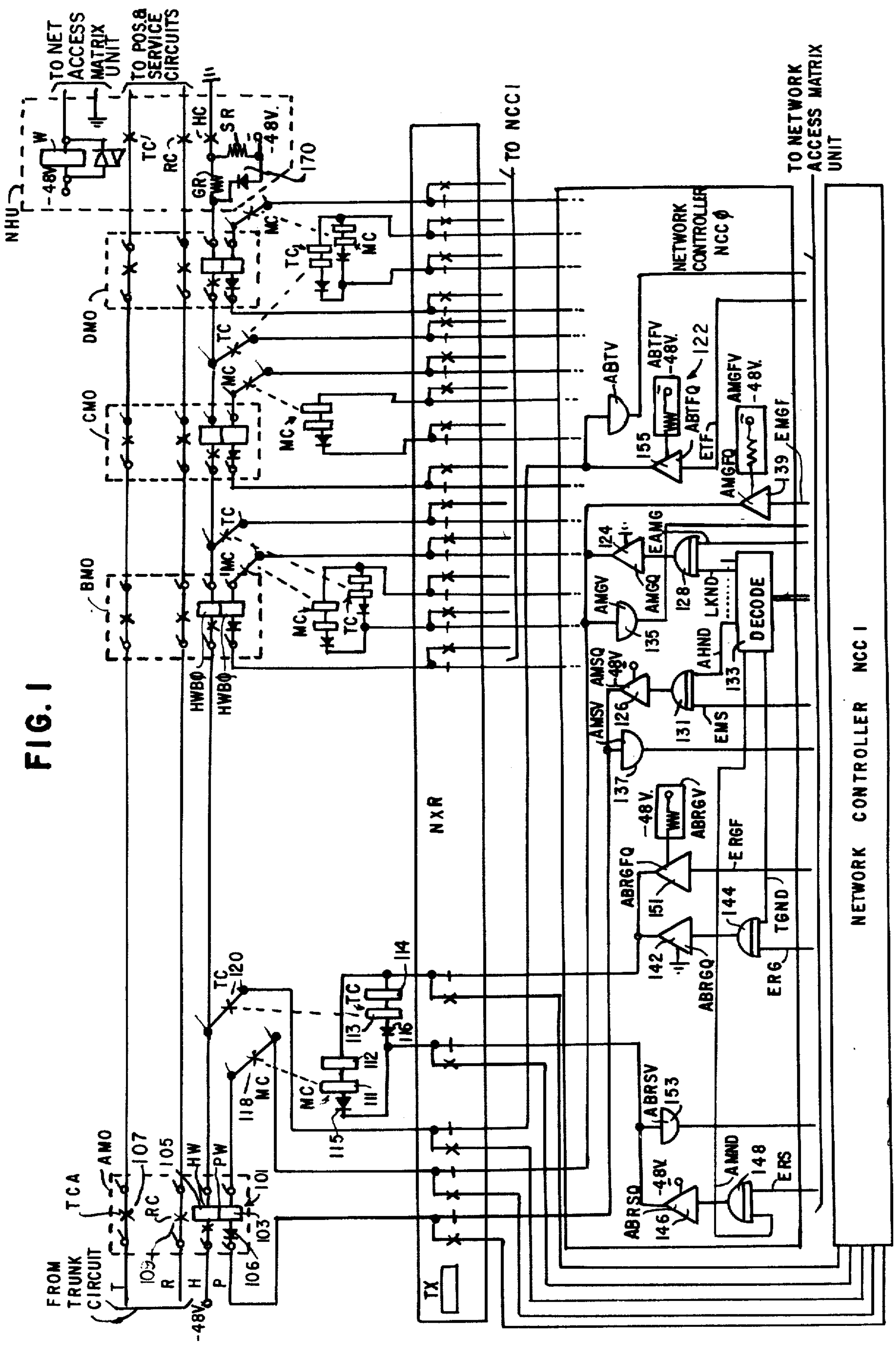
FIG. 1 is a simplified functional block diagram of a single path functional path network complex, which is constructed in accordance with the present invention.

Referring now to FIG. 1 of the drawings, each one of the crosspoint devices comprises a two-winding relay, such as the A matrix relay 1Ø1 having a PW pull winding 1Ø3 and a HW hold winding 1Ø5 and having normally-open TC contact 1Ø7 and normally-open RC contacts 1Ø9 for extending the tip and ring leads through the A matrix. A set of four mark/test relays, such as the pair of series-connected mark relays 111 and 112 connected in parallel with the series-connected test relays 113 and 114, each pair of relays being connected through the respective diodes 115 and 116, cause the operation and holding of selected relays of the A, B, C and D matrices. In this regard, via normally-open contacts MC, such as the contacts 118 of the relays 111 and 112, a selected pull or operate path is established to the winding 103 to operate the crosspoint relay 1Ø1 and for hereinafter described test purposes. Additionally, test contacts, such as the TC test contacts 12Ø of the relay 113, of the mark/test relays for each one of the hold path links between the four matrices connect test equipment, such as the equipment 122 of the controller NCCØ, to the hold lead link between adjacent matrices, such as the hold link between the A matrix and the B matrix, for testing purposes and for determining whether or not a link is busy. There are two mark relays and two test relays, because each one has four contacts thereon to provide eight mark contacts and eight test contacts. There are four sets of mark relays, one for each set of matrices (A, B, C AND D). There are only three sets of test relays, one for each link between adjacent matrices. It should be understood that while representative circuits of the network controller NCCØ are illustrated in FIG. 1, there are corresponding other circuitry (not shown) for the other three sets of matrices.

Figure 2:
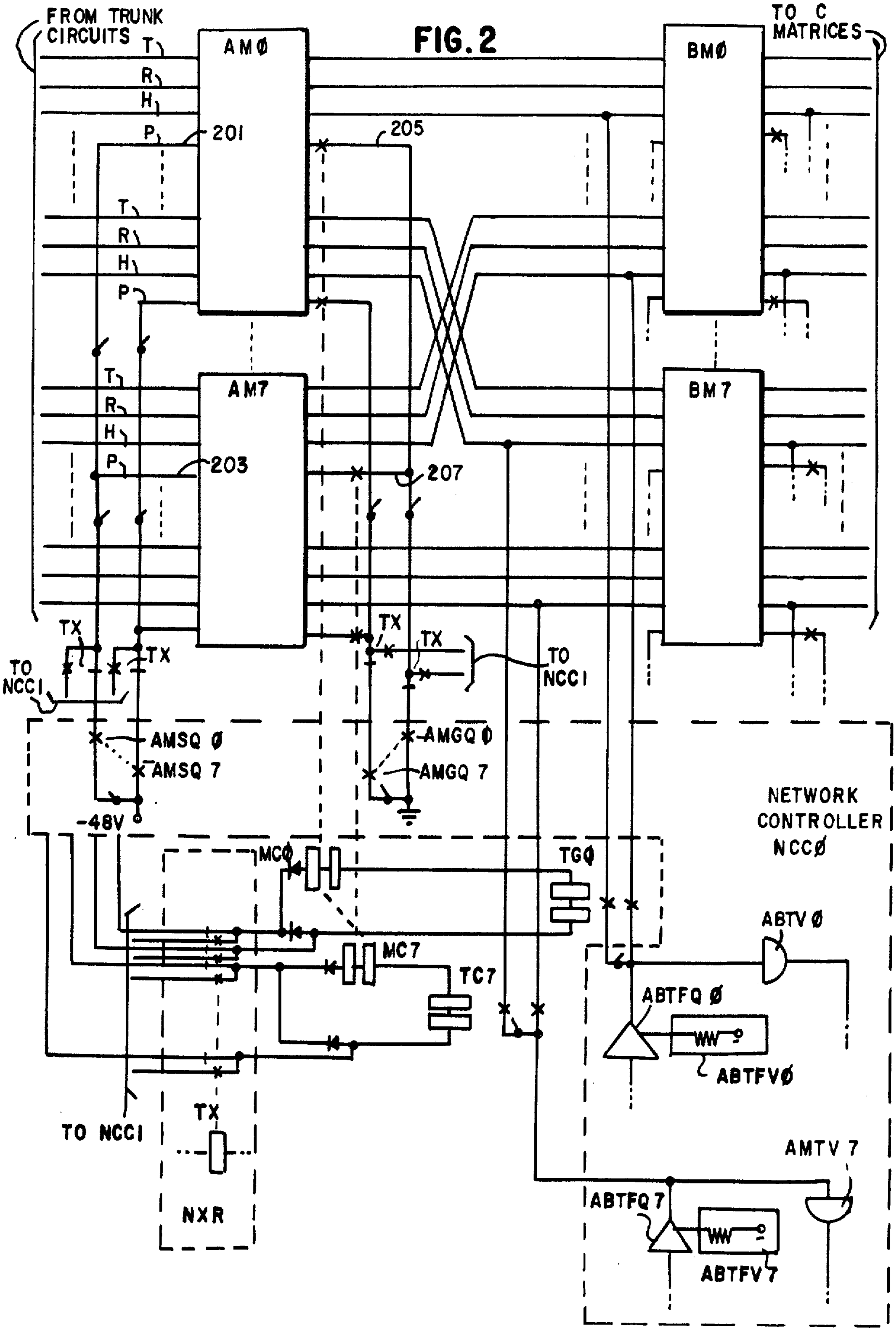
FIG. 2 is a functional block diagram of a portion of the network complex of the present invention.

The transfer relay circuit NXR of FIGS. 1 and 2 couples five leads associated with each mark/test relay set to either the controller NCCØ or the controller NCC1. In this regard, the TX transfer relays under the control of program generated signals from the common control via the matrix unit connect the two mark/test relay leads, the two pull leads and the one hold link test lead to either one of the controllers.

As best seen in FIG. 2 of the drawings, corresponding conductors at the inlets of the matrices are connected directly together in multiple and similarly, the corresponding conductors at the outlets of the matrices are connected directly together in multiple. For example, the pull lead 2Ø1 on the inlet side of the A matrix AMØ is connected directly to the first pull lead 2Ø3 at the inlet of the A matrix AM7 and to all other first pull leads of the remaining five matrices AM2 through AM6 (not shown). Also, the first pull leads at the outlets, such as the pull lead 2Ø5 of the A matrix AMØ, are connected to corresponding first pull leads at the other outlets of the matrices, such as the lead 2Ø7 of the A matrix AM7. As shown in FIG. 2, there are one set of mark relays for each one of the matrices. In the case of the A matrix there are eight A matrix units AMØ through AM7, and thus, there are eight pairs of mark relays MCØ through MC7. Thus, when one of the mark relays is operated, the selected mark relay connects the selected A matrix unit to the active network controller so that a particular inlet and outlet may be selected for energizing a selected crosspoint therein, in accordance with the present invention. Thus, the mark relays of the mark/test sets serve as a means to select one of the matrices, such as the A matrix units.

As shown in FIG. 1, after a matrix is selected, in order to pull a particular crosspoint switching device within the selected matrix, ground gates, such as the ground gate AMGQ gate 124 for the A matrices, connect ground potential via the network transfer relay circuit NXR, the mark contacts MC, such as the mark contacts 118, to the pull winding, such as the right-hand terminal of the pull winding 1Ø3 of the crosspoint relay 1Ø1, its diode, through the network transfer relay circuit NXR to the output of a sensing gate, such as the sensing gate AMSQ gate 126, which is an electronic gate for switching negative potential through the network transfer relay circuit to the left-hand terminals of the pull winding of the crosspoints. The gates SQ and GQ, such as the gates 124 and 126, are electronic switches which are enabled by AND gates, such as the gates 128 and 131 for enabling the respective gates 124 and 126. The gates 128 and 131 serve as a distributor in selecting the vertical and horizontal terminals (the inlets and the outlets of the matrices) of a switching matrix selected by the mark relays. The AND gates are enabled by an address generated by a decoder 133, which generates address signals, such as the signals LKND and AHND for enabling the respective AND gates 128 and 131, when certain other command signals are generated coincidentally therewith, such other command signals being, for example, the signals EAMG and EMS for the respective gates 128 and 131. The decoder 133 decodes the corresponding outputs from the network access matrix unit shown in FIG. 5, which unit contains bi-stable devices (not shown), such as latches, and sense gates (not shown), such as AND gates or the like, for providing control and sense points between the peripheral control unit of the common control and the network complex.

Eight ground voltage sensing test gates, such as the AMGV gate 135, for each of the sets of matrices have their inputs connected to the outputs of the ground gates, such as the AMGQ gate 124, for testing the proper operation of the pull path by detecting different signal levels thereon. Similarly, eight supply voltage test gates, such as the AMSV gate 137, for each of the sets of matrices have their inputs connected to the outputs of the supply gates, such as the supply AMSQ gate 126, for monitoring the operation of the pull path for detecting different signal levels thereon. The outputs of the ground test gates and the voltage supply test gates are connected to the network access matrix unit for conveying the output signals from such gates to the common control, which monitors the operation of the pull path. Also for test purposes, eight ground fault gates, such as the AMGFQ gate 139, for each set of matrices have their outputs connected to the inputs to the associated ground gates, such as the AMGQ gate 124, whereby a minus potential can be switched through the resistance AMGFV to the pull path for testing purposes. Such ground fault gates are enabled in response to the network access matrix unit under program control from the common control unit. For example, the gate 139 is enabled by the signal EMGF from common control via the network access matrix unit.

In order to operate the mark and test relays, eight ground gates, such as the ABRGQ gate 142, for each one of the sets of matrices have their outputs connected to the right hand terminals of the relays, such as the relays 112 and 114 for switching ground potential thereto under the control of a coincidence AND gate, such as the gate 144. Similarly, eight supply gates, such as the supply ABRSQ gate 146, for each set of matrices, have their outputs connected to the diode sides of the relays, such as the relays 111 and 116, to provide current paths for operating both the mark and test relays simultaneously. Eight coincidence AND gates, such as the gate 144, for each one of the four sets of matrices are operable by the common control via the matrix unit to energize their respective ground gates, such as the gate 142. Eight coincidence AND gates, such as the gate 148, for each one of the four sets of matrices, enables their supply gates, such as the gate 146, by signals from the decoder 133 and directly from the peripheral unit complex via the network access matrix unit. For test purposes, a set of eight fault gates, such as the ABRGFQ gate 151, for each of the four sets of matrices have their outputs connected to the outputs of the ground gates for the mark and test relays for supplying a negative battery potential via a resistance ABRGV when a signal, such as the signal ERGF, for the gate 151, becomes true from the common control unit via the network access matrix unit. Similarly, a set of eight test gates, such as the gate ABRSV 153, for each of the four sets of matrices have their inputs connected to the outputs of the mark and test relay supply gates, such as the gate 146, for supplying signals to the common control via the network access matrix unit to facilitate testing of the mark and test relays.

Considering now the test equipment for the hold paths, such as the test equipment 122, each one of the sets of test equipment includes a test fault gate, such as the ABTFQ gate 155 which connects minus potential through a resistance ABTFV to the hold link between adjacent matrices via the network transfer relays NXR and the test contacts, such as the TC contacts 120, to the link between the adjacent matrices. The gates, such as the fault gate 155, are energized by program generated signals from the common control via the network access matrix unit, and for example, the gate 155 is enabled by a signal ETF.

In order to hold a set of four cross-point relays, one in each of the four matrices AM, BM, CM and DM, operated to form an audio path over the tip and ring leads, a network hold unit NHU includes a relay W which is operated via program-generated signals from the common control via the network access matrix unit to extend the tip and ring audio conductors to the position and service circuits and to close a contact HC for extending a ground potential through a current-limiting resistor GR to maintain operated the four hold windings of the four selected relays in series with a negative supply voltage at the inlet side of the A matrix. For the purpose of insuring dry switching of the crosspoint contacts, a negative supply voltage is connected through a resistor SR to a point between the resistor GR and the contacts HC, and is connected through a diode 170 between the resistor GR and the outlet of the D matrix. As shown in FIG. 5, it should be understood that since corresponding outlet conductors from each one of the four network units are connected together in multiple, the hold relays need only supply the holding ground potential for as many outlets as there are from only one network unit.

GENERAL SYSTEM DESCRIPTION

Figure 4:
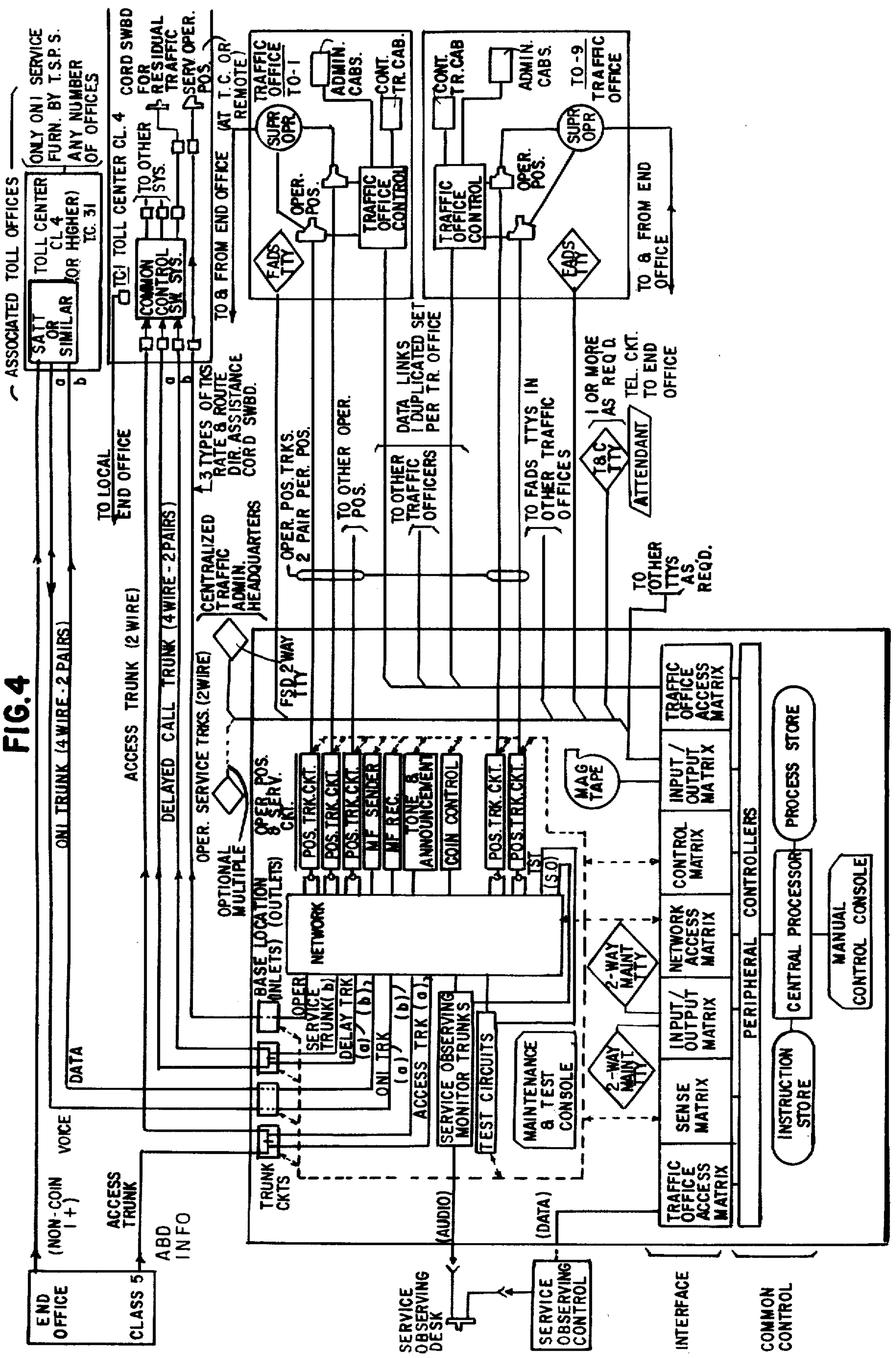
FIG. 4 is a block diagram of the system in which the network control arrangement of the present invention is embodied.

Referring now to FIG. 4, the system in which the present invention is incorporated is a traffic service position system (TSPS), which permits and induces more customer dialing of toll calls and to automate the processing of those calls as far as is feasible. The TSPS system is adapted to provide operator assistance and other services for class 5 end offices attempting calls to associated toll offices. Expanded Direct Distance Dialing (EDDD) permits dialing of nearly all toll calls not presently handled by DDD. The TSPS system generally comprises a single base location and a group of traffic offices TO-1 through TO-9 which are distributed in advantageous locations and which may or may not be located remotely relative to the base location. The base location generally comprises a group of trunk circuits connectable between end offices and toll offices under the control (broken lines) of a stored-program common control via an interface, and a network arrangement for interconnecting the access trunk circuits with a group of position trunk circuits connected to operator positions of the traffic offices and with a group of service circuits serving as multi-frequency senders, multi-frequency receivers, tone and announcement circuits and coin control circuits. As shown in the drawings, the common control interface includes various different sense and control point matrix circuits for sensing different signals in the system and for temporarily storing information. Teletypewriters are provided for maintenance purposes and for time and charges information. The common control is disclosed in said COMMON CONTROL patent application. The base location further includes test circuits operative under the control of a maintenance and test console, and a service observing monitor trunks under the control of a service observing desk which has an audio connection to the service observing monitor trunks and has a data link to the traffic office access matrix via a service observing control circuit for testing the network.

The traffic offices each include operator position consoles connected to a traffic office control arrangement, and connected to supervisory operator positions, which are coupled to the end offices. The traffic control arrangement are also connected to administrative and controlled traffic cabinets. A force administration and traffic engineering date system including a teletypewriter is connected to the input/output matrix of the interface arrangement. The trunk circuits are relay circuits for providing the TSPS system with an information and control point on the trunk between the class 5 office and the class four office. A delay call trunk is available to operators with two legs or conductors into the class four office. An ONI (Operator Number Identification) trunk provides a link with other systems such as a Stroger Automatic Toll Ticketting System SATT, for the purpose of allowing the TSPS system operator to secure and enter the calling number in those systems. The stored program control central processor unit CPU of the system utilizes an instruction store memory sub-system associated with the CPU in which is stored "permanent" information, such as call processing instructions, translation data, and diagnostic routines. A process store memory sub-system associated with the CPU stores temporary information accumulated during call processing. The peripheral controller the CPU to communicate with the matrices, such as the network access matrix so that the CPU obtains current information about the system and conveys information thereto.

The traffic office is a complex which includes up to 62 operator positions, arrangements for administrative, supervisory and training functions, and control equipment for these units. The positions in a TSPS may be grouped into as many as 9 traffic offices, each of which may be located at a different site within 50 miles of the base installation. The service circuits may be temporarily associated with trunks in order to provide specific functions. Included in this category are receivers, for obtaining called and calling numbers, senders, for extending calls into the toll office, and tone and announcement circuits for passing audio information to the trunk. Service circuits operate under control of the unit CPU.

The network is an array of crosspoint devices reed relays arranged to permit the temporary association of trunks with positions and service circuits.

A magnetic tape subsystem provides an output of system data for further processing off-line. Principal data are call records, provided for purposes of customer billing. The time and charges reporting equipment provides customers with an immediate report of the elapsed time and the charges incurred on specific toll calls.

The Force Administration and Traffic Engineering Data System FADS provides information on a timely basis for administering the Traffic Offices, and information for off-line processing pertinent to equipment engineering.

Via access trunks from local offices, customers may dial their own person, collect, notify, credit card and bill to third number calls from non-coin and coin telephones.

The connection to the called number is set up when the operator is bridged onto the call, thus improving the speed of service. Normally, by the time the operator has determined how assistance may be given the calling customer, the called telephone will have answered. The operator then only need determine that the proper person is reached, or that a collect call is accepted. If the call is to be billed to a third number or is a credit card call, the operator records the billing numbers by keying them into the system, thus avoiding the need for preparing a ticket.

These same types of calls may also be made from coin telephones, as well as station sent paid calls.

The operator receives visual displays, in most cases, of the amount of money due and supervises its collection. Once conversation starts, the operator is released from the connection. Notification of the end of the initial period and collection of overtime charges are made by any operator who is available when it is time to perform these functions. The equipment associated with the TSP system does all the remembering and calculations required.

The advantages of automated handling may be extended to those calls in which the customer only dials "0", and waits for an operator to answer. In most cases, the operator is able to key the desired called number into the machine, and can be relieved of the task of timing and ticketing the call.

In these ways, operator work time per call is reduced, permitting fewer operators and positions to handle a given volume of traffic.

The system is arranged for up to 310 positions to function as a single team, with calls distributed on a rotational basis to staffed and idle positions. The large team permits efficient staffing over a wide range of offered call volume, including late night. However, the positions are physically arranged in groups of not more than 62 each. These groups may be located remotely from the base unit and from each other, permitting advantageous selection of working conditions and labor markets.

The system encompasses the ability to serve many call types and may be associated with different kinds of connecting offices. The following is a brief description of a particular call in order to illustrate some of the techniques of call processing.

Calls entering the TSPS system via the access trunks are broadly categorized in accordance with the characteristics of the calling station (usually coin, non-coin, hotel) and by the apparent intentions of the caller as evidenced by the manner in which the call was placed (1+, 0+, or 0−). A call from a coin station is assumed in which the user dials 0, followed by a seven or 10 digit number which is repeated by dial pulse to the TSPS system.

Each access trunk is associated with input detector points that exhibit the on-hook or off-hook status from the local (class 5) office, and from the toll office. The latter is of significance only on active calls. These points are repetitively scanned at short intervals by the CPU, and on each scan, the "present" state is compared with the state at the "last look", which is a record maintained in the process store. When a particular trunk is seized by the end office, in response to the 0 dialed by the customer, the mismatch of the present state with the last look defines the origination to the CPU. By consulting stored information associated with that trunk, a determination is made that the called number will be transmitted by dial pulse. For this case, the scan is provided at intervals short enough to ensure that each new state is observed at least once; thus, the succession of on-hook, off-hook transitions that constitute a dial pulse train are detected, counted and recorded in the process store. Inter-digital pauses are noted by timing. When the total number of digits received constitutes the address of a valid destination, the calling number is needed. Assuming that the originating office can furnish this via automatic number identification (ANI), the CPU selects an idle MF receiver and instructs the network control to set a path between the trunk and that receiver. When this has been accomplished, an output generator point associated with the trunk is set, which causes off-hook to be returned to the local office as a signal to transmit the calling number via MF. This is received and transferred, one digit at a time, to the process store. After the calling number is complete, the network control is instructed to take down the connection to the MF receiver.

Since a coin call placed on an "0+" basis is assumed and the originating and terminating points are now known, memory is then checked to determine if this call can be automatically rated. Assuming this is the case, the charges for the initial period, including tax are calculated at the person rate.

The call is next assigned to an available position and the appropriate network connection is established by the network control as directed by the CPU. Simultaneously, data in the process store is transmitted to the control complex at the required traffic office, causing specific lamp signals to be activated at the selected TSP. For the assumed case, these lamps include a digital display of the calculated charges and time of the initial period, and a "class of call" lamp designated COIN, 0+. The call appears on one of the three loops on the position, which is also indicated by a lamp signal. The operator is alerted by an order tone of the receipt of a call, following which the voice path to the subscriber is automatically completed.

After the position is connected to the trunk through the network, a second network connection is automatically established between the trunk and an idle sender. The trunk provides for two simultaneous network connections, one to the "local" side and the other to the "toll" side.

The sender immediately begins to outpulse under control of the CPU. Depending upon the requirements of the toll office, the signalling mode may be DP or MF, or a combination thereof. The call is, therefore, being advanced toward its destination while the operator is determining how assistance may be given this call. If the call is person sent paid, as inferred from the manner in which it was placed, the operator supervises the collection of coins and verifies that the desired party has been reached.

If, however, the customer wishes to use a credit number on a person basis, the proper type of billing indication is keyed, which is registered in the process store and which causes the display to be cleared. The ten digit credit card number is obtained and keyed into the process store. These operations may overlap the return of ring-back tone from the called office, since the sender has been functioning independently of the operator's keying actions. When the desired party is obtained, the operator authorizes the start of timing and retires from the call.

The call is now "floating", supervised only by the CPU. All call data is in the process store and time is being accumulated; no timing or ticket writing functions have been performed by the operator.

When on-hook is detected from the calling party, time accumulation is suspended and 2.2 second timeout is initiated, if the on-hook persists after the timeout, the call is considered terminated. Call data is passed from the process store to the tabulator system to be recorded for off-line processing. Output generator points associated with the trunk are reset by the CPU to cause on-hook to be indicated to both the local and toll offices, which in turn releases all switched connections. The trunk is now available for another call.

If an off-hook condition is again detected from the originating subscriber during the 2.2 second timeout for disconnect, a flash recall is recognized and the call is again assigned to a position. This is (probably) not the position that was assigned originally; however, any call details needed by the new operator are brought up automatically or are available upon request via the digit display.

If special circumstances warrant, the operator may hold a call and prepare a manual ticket. In other special circumstances, the TSPS operator may pass a call to cord board for manual handling.

If the call in the above example had been placed from a non-coin station, the operations would be similar except that no charge would be computed prior to the initial entry, and the class of call lamp would indicate NON-COIN, 0+.

NETWORK COMPLEX

Considering now the network complex in greater detail with reference to FIG. 5 of the drawings, under software control, the network complex establishes audio connections between trunk circuits located on the trunk side of the complex and any desired operator or service circuitry located on the position side of the complex.

The nomenclature used to identify the network complex hardware has been introduced as required in the hardward circuit description. The following nomenclature information is useful for reference purposes, and provides a more detailed explanation of the notation.

Devices are identified by a group of alphabetic characters, which indicate the general type of device, followed by a group of numeric characters which indicate the particular device. Octal notation is used for the numerics.

A device is identified only to the level required in the discussion at hand. For example:

a. If an A matrix position is being considered within the network complex, NU3.TG7.AM7 is used.
b. If an A matrix within a known trunk grid is being considered, merely AM7 is used.

The numeric identification of a particular device within a group is indicated in one of three ways, depending upon the context in which the description is used. The distinctions are best shown by examples:

a. To indicate an individual mark/test relay contact, as on a circuit diagram, MC5 is used.

b. To indicate an individual relay contact, as in a discussion of the circuit, MC (MCN) is used.

c. To indicate all contacts of a single relay, MC* is used. This notation is used only where it helps clarify a description.

Considering now the numbering of network terminals and hold relays, a network trunk terminal number NTTN is the designation of the position of a NTT terminal in the network complex. This number is expressed as: NTTN = (NUN) (TGN) (AMN) (AHN). A network position terminal number NPTN is the designation of the position of an NPT terminal in the network complex. All corresponding norizontal terminals HT terminals of each D matrix are multiplied, so that the NUM number does not participate in the NPTN number. This number is expressed as: NPTN = (PGN) (DMN) (DHN). A hold relay number HRN is the designation of the position of a HR relay in the network complex. This number is expressed in one of two ways: HRN = (PGN) (DMN) (DHN) = NPTN (Hardware-Oriented); or, NHG(NAMN).W-(NAMWN).B(CMPN) (CMP-Oriented)

The following table summarizes network hardware circuit symbols:

| Symbol | Device Name | Example of Complete Description |
|---|---|---|
| NU | Network unit | NU3 |
| NAMU | Network access matrix unit | NAMU |
| NAM | Network access matrix | NAM 5 |
| NHU | Hold relay unit | NHU |
| NBH | Hold path battery disconnect | NBH4 |
| NHG | Hold relay group | NHG3 |
| HR | Hold relay<br>hardware-oriented:<br>CMP-oriented:<br>NHG3.W03.B20 | <br>HR6407 |
| NCC | Network controller | NU3.NCC0 |
| TG | Trunk grid | NU3.TG5 |
| PG | Position grid | NU3.PG2 |
| NXR | Transfer relay group | NU3.NXR |
| AM | A matrix | NU3.TG5.AM7 |
| BM | B matrix | NU3.TG5.BM7 |
| CM | C matrix | NU3.PG2.CM7 |
| DM | D matrix | NU3.PG2.DM7 |
| AB | AB link group | NU3.TG5.AB6 |
| BC | BC link group | NU3.TG5.BC6 |
| CB | CB link group | NU3.PG2.CB6 |

-continued

| Symbol | Device Name | Example of Complete Description |
|---|---|---|
| DC | DC link group | NU3.PG2.DC6 |
| ABR | AB mark/test relay group | NU3.TG5.ABR6 |
| BCR | BC mark/test relay group | NU3.TG5.BCR6 |
| CBR | CB mark relay group | NU3.PG2.CBR6 |
| DCR | DC mark/test relay group | NU3.PG2.DCR6 |
| NTT | Network trunk terminal | NTT35737 |
| NPT | Network position terminal | NPT2717 |
| HT | Matrix horizontal terminal | NU3.TG5.BM7.HT6 |
| VT | Matrix vertical terminal | NU3.TG5.BM7.VT4 |
| AH | A matrix horizontal terminal | NU3.TG5.AM7.AH37 |
| DH | D matrix horizontal terminal | PG2.DM7.DH17 |
| XP | Crosspoint assembly | NU3.PG2.CM7.XP6,5 |
| L | Lead within A bus | NU3.TG*.AMS.L37 |
| LK | Link within A link group | NU3.TG5.AB1.LK3 |
| V | Voltage sensor | NU3.NCC0.AMGV4 |
| Q | Gate | NU3.NCC0.AMGQ4 |
| P | Pull | NU3.PG2.CM7.VT6.P |
| H | Hold | NU3.PG2.CM7.VT6.H |
| R | (depends on context)<br>relay group:<br>resistor:<br>ring: | <br>NU3.NXR<br>HR7717.GR<br>NU3.PG2.CM7.VT6.R |
| T | (depends on context)<br>tip:<br>test: | <br>NU3.PG2.CM7.VT6.T<br>NU3.TG5.ABR6.TC7 |
| M | Mark | NU3.TG5.ABR6.MC7 |
| C | Relay contact | NU3.PG2.CM7.XP6,5.TC |
| W | Relay winding | NU3.PG2.CM7.XP6,5.PW |
| D | Diode | NU3.PG2.CM7.XP6,5.PD |
| S | Supply | NU3.TG*.AMS |
| G | Ground | NU3.TG*.AMG |

Considering now device numbering interrelationships, because of the manner in which the switching section designations are assigned, many interrelationships exist. In the next table, device numbers which are numerically equal are grouped together. For example: AMN = ABN =ABRN =HTN (of BM) = LK (of ABRS) = AN (of BMS).

From the next table, it will be noted that all designations can be resolved into only nine basic numbers: NTTN, NPTN, DHN, TGN, AMN, AHN, PGN, DMN, and LKN. An additional relation is seen on FIG. 24: NAMN = NHGN.

The following table lists equivalent device numbers:

| Network Terminal Number | Hold Relay Number | Trunk Grid or Position Grid Number | Matrix Number | Link or Link Group Number | Mark/Test Relay Group Number or Contact Number | A or D Matrix Horizontal Terminal Number | Matrix Terminal Number | Lead Number (within a Bus) |
|---|---|---|---|---|---|---|---|---|
| NTNN<br>NPTN | <br>HRN | | | | | DHN | HTN (of DM) | LN (of DMS) |
| | | TGN | | CBN | CBRN | | VTN (of CM) | LN (of CBRS) |
| | | | AMN | ABN | ABRN | | HTN (of BM) | LN (of ABRS)<br>LN (of BMS) |
| | | | | | | AHN | HTN (of AM) | LN (of AMS) |
| | | PGN | | BCN | BCRN | | VTN (of BM) | LN (of BCRS) |
| | | | DMN | DCN | DCRN | | HTN (of CM) | LN (of DCRS)<br>LN (of CMS) |
| | | | BMN | LKN | MCN | | VTN (of AM) | LN (of AMG) |
| | | | CMN | | TCN | | VTN (of DM) | LN (of BMG) |
| | | | | | | | | LN (of CMG)<br>LN (of DMG) |

The network complex consists of four network units NUØ through NU3, a maximum of eight hold relay groups NHG, and a maximum of eight network access matrices NAM. The NAM matrices collectively form a network access matrix unit NAMU. The NHG groups collectively form a hold relay unit NHU.

A network unit, consisting of a network switching section and a network controller section, contains the switching and control equipment to establish a number of network connections, one at a time. The hold relay unit provides means to latch up the individual established connection for as long as required.

Both the NU units and the NHU units operate under complete software control via the unit NAMU.

Access and miscellaneous trunk circuits are wired to the network trunk terminals NTT. The maximum number of NTT terminals for a full size TSPS installation is 8192 provided by four NU units each NU unit with a maximum of 2048 trunk terminals.

For each TSPS installation, the trunk circuits will be dedicated to particular NTT terminals. Intermediate distribution frames are therefore not required.

Position and service circuits are wired to the network position terminals NPT. The maximum number of NPT terminals for a full size TSPS installation is 1024 which are provided by the hold relay unit NHU. The NHU unit derives the NPT terminals from corresponding position terminals of the individual NU units. These corresponding individual position terminals are multiplied together to provide access from any NTT terminal to any required NPT terminal. This implies that for a given installation each individual unit NU has to provide as many individual position terminals as there are NPT terminals.

The relation between the NPT terminals, NU units and required individual position terminals per NU unit for four typical TSPS system sizes is shown in the following table:

| | | | | |
|---|---|---|---|---|
| Number of NPT terminals | 256 | 512 | 768 | 1024 |
| Number of NU terminals | 1 | 2 | 3 | 4 |
| Minimum number of individual position terminals for each individual NU unit | 256 | 512 | 768 | 1024 |

An NU unit is designed to carry 138 erlangs or traffic which approximately corresponds to the maximum traffic that can be handled by 80 positions and the associated service circuits located on the position side of the network complex.

On the trunk side, the traffic originates from the access and miscellaneous trunk circuits. An average unit NU accommodates approximately 500 access trunk circuits, each circuit requiring two NTT terminals. In In special cases (large proportion of low traffic trunks or a large proportion of trunks carrying predominantly non-coin, 1+ traffic) each NU unit accommodates about 750 access trunks.

NETWORK SWITCHING SECTION

The switching section is a four stage cross-point matrix array consisting of an A and a B stage arranged into trunk grids and a C stage and a D stage arranged into position grids. Pull windings of four individual crosspoint assemblies, one crosspoint assembly per stage are energized (pulled) under control of the network controller section. The combined circuitry in the switching section associated with the pull function is referred to as the network pull path. Series connected hold windings of four pulled crosspoint assemblies are electrically latched (held) under control of the hold relay group. The combined circuitry in the switching section associated with the hold function is referred to as the network hold path. The tip and ring (T and R) contacts of four series connected crosspoint assemblies, operated under control of the pull and/or the hold function, establish an audio connection through the network unit. The combined circuitry in the switching section associated with the audio function is referred to as the network audio path.

MODULAR HARDWARE CONFIGURATION

A switching section consists of eight trunk grids (TG's) and eight position grids (PG's) which are identified by trunk grid numbers (TGN's), ranging from Ø through 7. Likewise, the position grids are identified by position grid numbers (PGN's), ranging from Ø through 7.

LINK GROUP INTERCONNECTING TG'S AND PG'S

The TG's and PG's are interconnected by 64 link groups of eight links each. These link groups have two designations, depending upon whether one observes the link group from the TG's or PG's. If the link group emanates from a trunk grid, it is designated by BC link number (BCN), ranging from Ø through 7. The BC link group number corresponds to the number of the position grid to which the link group is connected.

$$BCN = PGN \quad \emptyset \leq N \leq 7$$

Similarly if the link group emanates from a position grid, it is designated by a CB link number (CBN), ranging from Ø through 7. The CB link group number corresponds to the number of the trunk grid to which it is connected.

$$CBN = TGN \quad \emptyset \leq N \leq 7$$

Example: The link group interconnecting TGØ and PG3 can be designated by either of the following notations:

TGØ.BC3 (as seen from TG's) or
PG3.CBØ (as seen from PG's).

TRUNK GRID (SEE F. 3)

The trunk grids are the primary modules which in total make up the A and B stages of the switching section. The trunk grid consists of eight A matrices (AM's) each identified by an A matrix number (AMN), ranging from Ø through 7, and eight B matrices (BM's), each identified by a B matrix number (BMN), ranging from Ø through 7.

As shown in FIGS. 4A and 4B, each A matrix can be provided with 8, 16, 24, or 32 horizontal terminals HT, the exact number being dependent on the traffic requirements. The HT terminals are identified by a horizontal terminal number HTN, ranging in the maximum case from ØØ through 37 (Octal Notation). There are 8 A matrix vertical terminals VT terminals designated by a vertical terminal number VTN, ranging from Ø through 7.

Each B matrix has eight HT terminals, designated by a horizontal terminal number HTN ranging from Ø through 7, and eight VT terminals designated by a vertical terminal number VTN, ranging from Ø through 7.

For the implementation of the trunk grid matrices, 8 × 8 (eight horizontal, eight vertical) matrix subassemblies are utilized. While this basic size fulfills the requirements for all B matrices and all A matrices having eight HT terminals, expansion of the A matrices to 16, 24, or 32 HT terminals requires the use of 2, 3, or 4 sub-assemblies respectively. By connecting identically numbered VT terminals in parallel, matrix sizes of 16 × 8, 24 × 8, or 32 × 8 can be obtained.

As shown in FIG. 4C, the trunk grid crosspoint assemblies XP which make up the A and B matrices are identical. An individual crosspoint assembly is located at the intersection of a matrix horizontal and vertical and is identified by the respective horizontal terminal number and vertical terminal number, XP (HTN, VTN).

Each crosspoint assembly consists of:

1. a pull winding and series diode to operate all contacts within the assembly,
2. a hold winding and series contact to latch up the assembly, and
3. two contacts which switch the tip and ring (T and R) leads of the audio pair.

Figure 7:
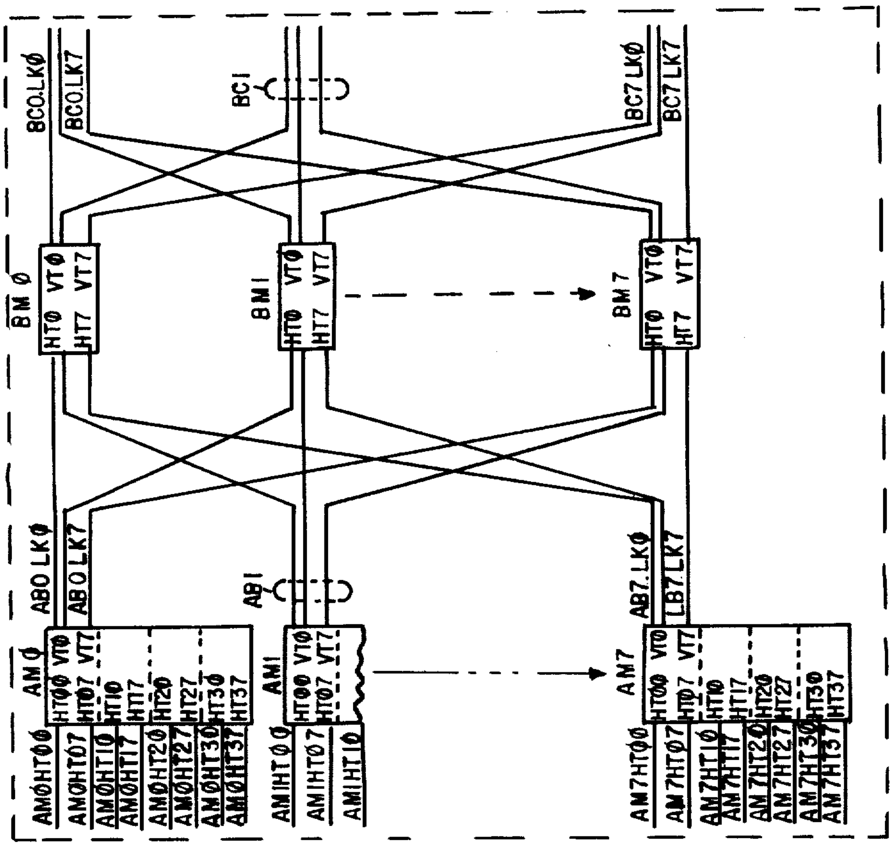
Figure 6:
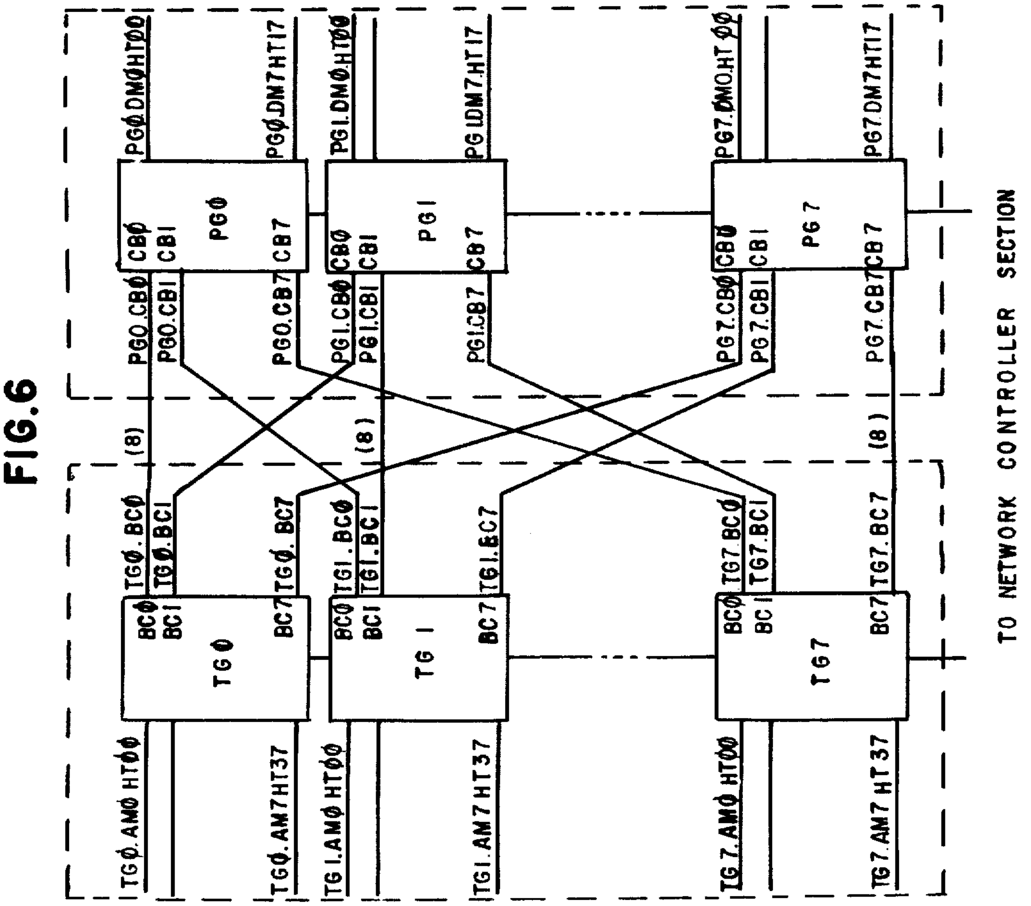
Figure 8C:
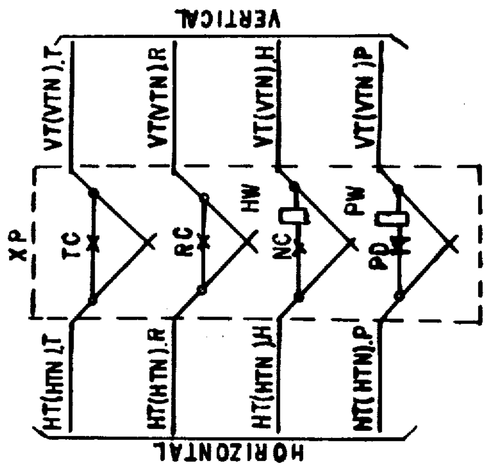
Figure 8B:
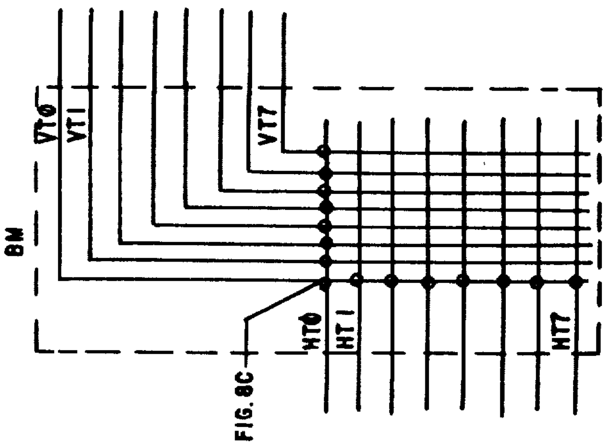
Figure 8A:
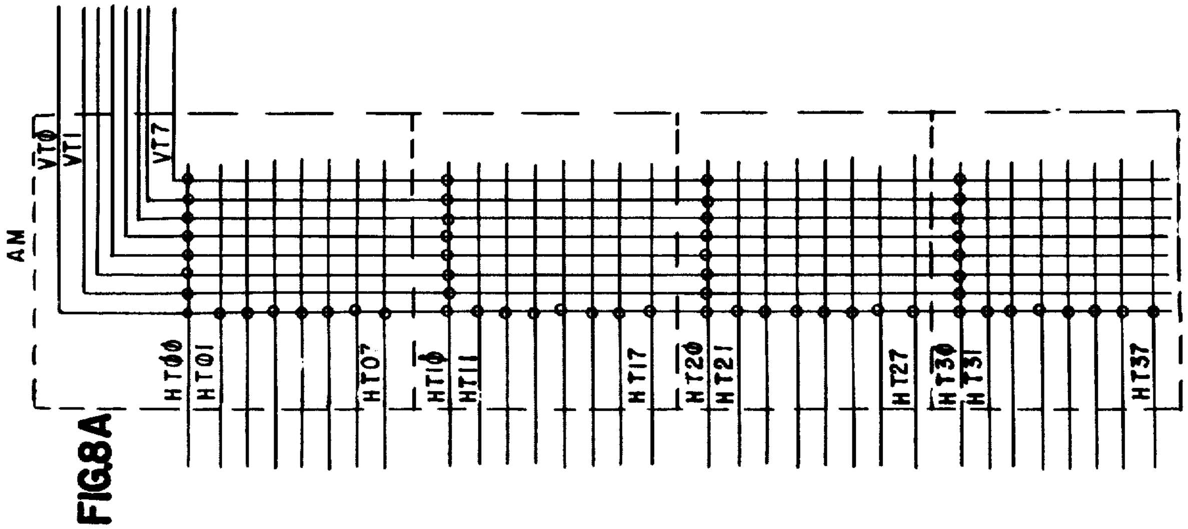

As shown in FIG. 7, within each trunk grid, there are eight AB link groups which interconnect the A and B matrices. An AB link group is formed by grouping the eight vertical terminals VT's) emanating from one A matrix. Each group is designated by an AB link group number (ABN) which is identical to the number of the A matrix with which it is associated. Thus the range of the ABN is from Ø through 7.

ABN = AMN   Ø ≤ N ≤ 7

Example: AB6 is composed of the eight VT's of A matrix 6, (AM6).

Each AB link group is composed of eight links LK, identified by a link number LKN, ranging from Ø through 7. The LKN links are identical to the number of the A matrix VT terminals from which they emanate and also to the number of the B matrices to which the respective links are connected.

LKN = VTN (A matrix) =BMN   Ø ≤ N ≤ 7

Example: AB2.LK3 is the link from AM2 to BM3. This link is part of link group AB2.

Within each trunk grid, there are eight BC link groups (of eight links each) which access the position grids of the switching section. A BC link group is formed by grouping identically numbered VT terminals from each of the eight B matrices. Each link group is designated by a BC link group number (BCN) which is identical in number to the VT terminals which form it and also identical in number to the position grid to which the link group is connected. The range of the BCN, therefore, is from Ø through 7.

BCN = VTN (B matrix) = PGN   Ø ≤ N ≤ 7

Example: BC7 is composed of the number 7 vertical terminals from each of the eight B matrices. This link group is connected to PG7.

Each BC link group is composed of eight links LK identified by a link number LKN, ranging from Ø through 7. The LKN numbers are identical to the number of the B matrix from which they emanate and also to the number of the C matrices to which the respective links are connected.

LKN = BMN = CMN   Ø ≤ N ≤ 7

Example: BC3.LK5 is the link from BM5 to CM5 of PG3. This link is part of link group BC3.

Figure 9:
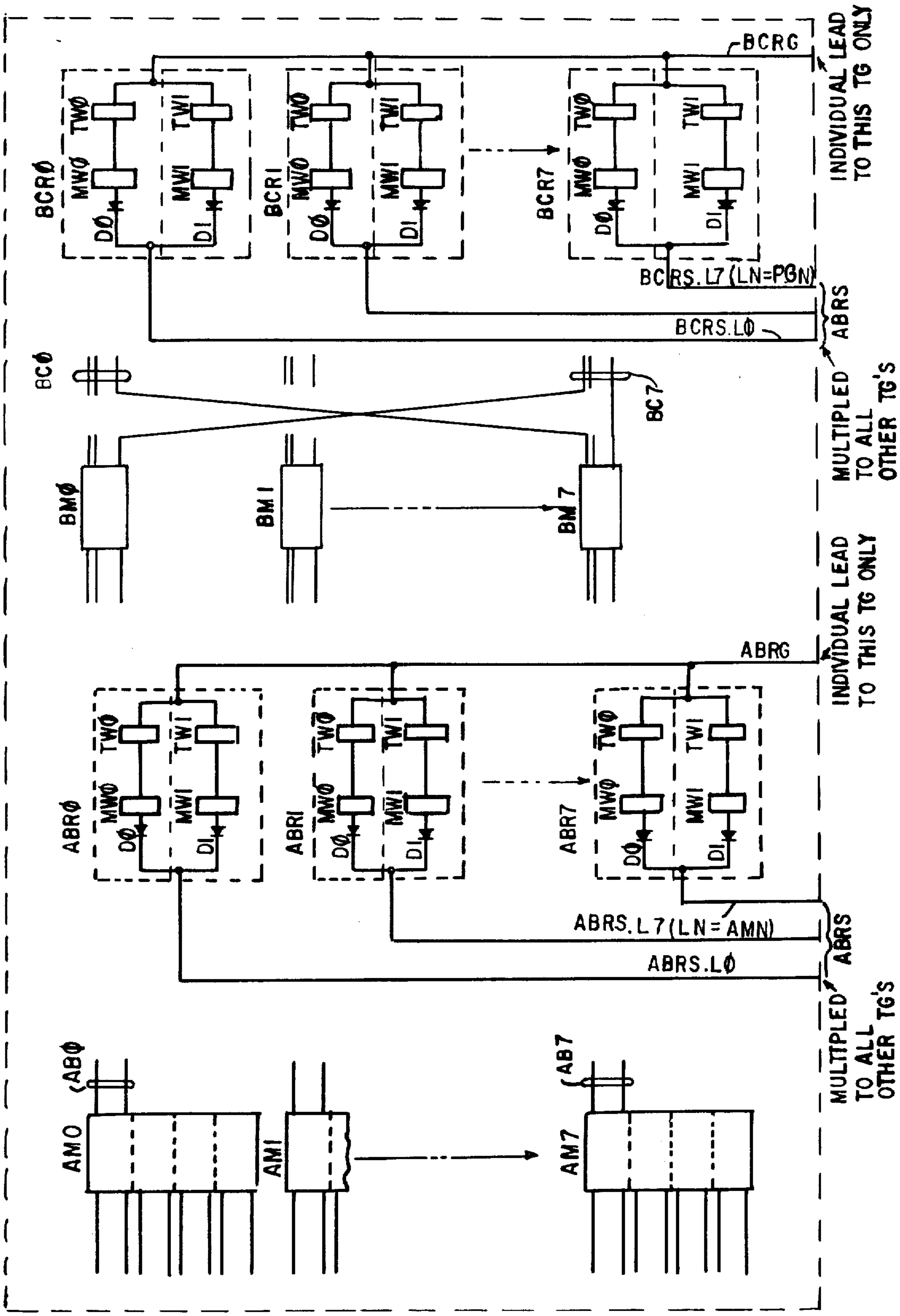

Considering now the mark/test relays in greater detail with reference to FIG. 9, in accordance with the present invention, permanently assigned to each AB and BC link group, within a trunk grid, is an individual mark/test relay group, ABR or BCR respectively. Each relay group is designated by a relay group number, ABRN or BCRN, which is identical in number to the link group with which it is associated.

ABRN = ABN = AMN   Ø ≤ N ≤ 7

BCRN = BCN = VTN (B matrix) = PGN   Ø ≤ N ≤ 7

Each relay group contains two sets of 8 contacts. One set performs a switching function in the pull path of the corresponding link group. This set of contacts is called the mark contact set, MC*, and is implemented with two sets of four contacts. In the preferred form of the invention, the contacts and their associated coils, MWØ and MW1 are mounted on different printed circuit cards for maintenance purposes.

The second set of eight contacts performs a switching function in the hold path of the corresponding link group. This set of contacts is called the test contact set TC* and is implemented with two sets of four contacts. The contacts and their associated coils TWØ and TW1 are mounted on different cards.

In the preferred form of the invention, the relay assignments for the ABR and BCR groups are as follows:

| Relay Location | Winding Designation | Contact Designation | |
|---|---|---|---|
| Card Ø | MWØ | MCØ - MC3 | MC* |
| Card 1 | MW1 | MC4 - MC7 | |
| Card Ø | TWØ | TCØ - TC3 | TC* |
| Card 1 | TW1 | TC4 - TC7 | |

Each singular contact in either the mark contact set or test contact set corresponds to the individual link within the proper link group.

MCN = TCN = LKN Ø ≤ N ≤ 7

Examples:

1. ACR1.MC3: Contact is connected to the trunk grid pull path, specifically, LK3 of AB link group 1.
2. ABR1.TC3: Contact is connected to the trunk grid hold path, specifically, LK3 of AB link group 1.

One trunk grid is shown in FIG. 9. Therefore it is sufficient to designate the ABR and BCR groups as shown (e.g., ABRØ – ABR7; BCRØ – BCR7.) When it is necessary to designate an ABR or BCR group within an entire NU unit, they are prefixed as shown in the following examples:

TG3.ABR5=ABR5 in TG3
TGØ.BCR6=BCR6 in TGØ

It is necessary to operate only one ABR group in an entire NU unit at any given time. As shown in FIG. 9, the "ground" sides of number ABRØ through number ABR7 are wired together to ABRG (ABR ground lead). Each group TG has a separate ABRG group. To distinguish these leads in various TG groups, there is a prefix as in the following example:

TGØ.ABRG=ABRG of TGØ

The "supply " side of each ABR is wired to the correspondingly numbered lead on the ABR supply bus ABRS. This bus is shared by all TG group in a NU unit.

To operate, for example, TG7.ABR3, the network controller places ground on TF7.ABRG and places supply voltage on ABRS.L3.

A similar matrix arrangement exists for the BCR group in an NU unit. Ground wires BCRG are individual per TG group and supply bus BCRS is common for all TG's. This allows one-at-a-time operation of any BCR in an NU unit.

Example: To operate TG3.BCR5, lead TG3.BCRG is grounded and voltage is applied to lead BCRS.L5.

Figure 10:
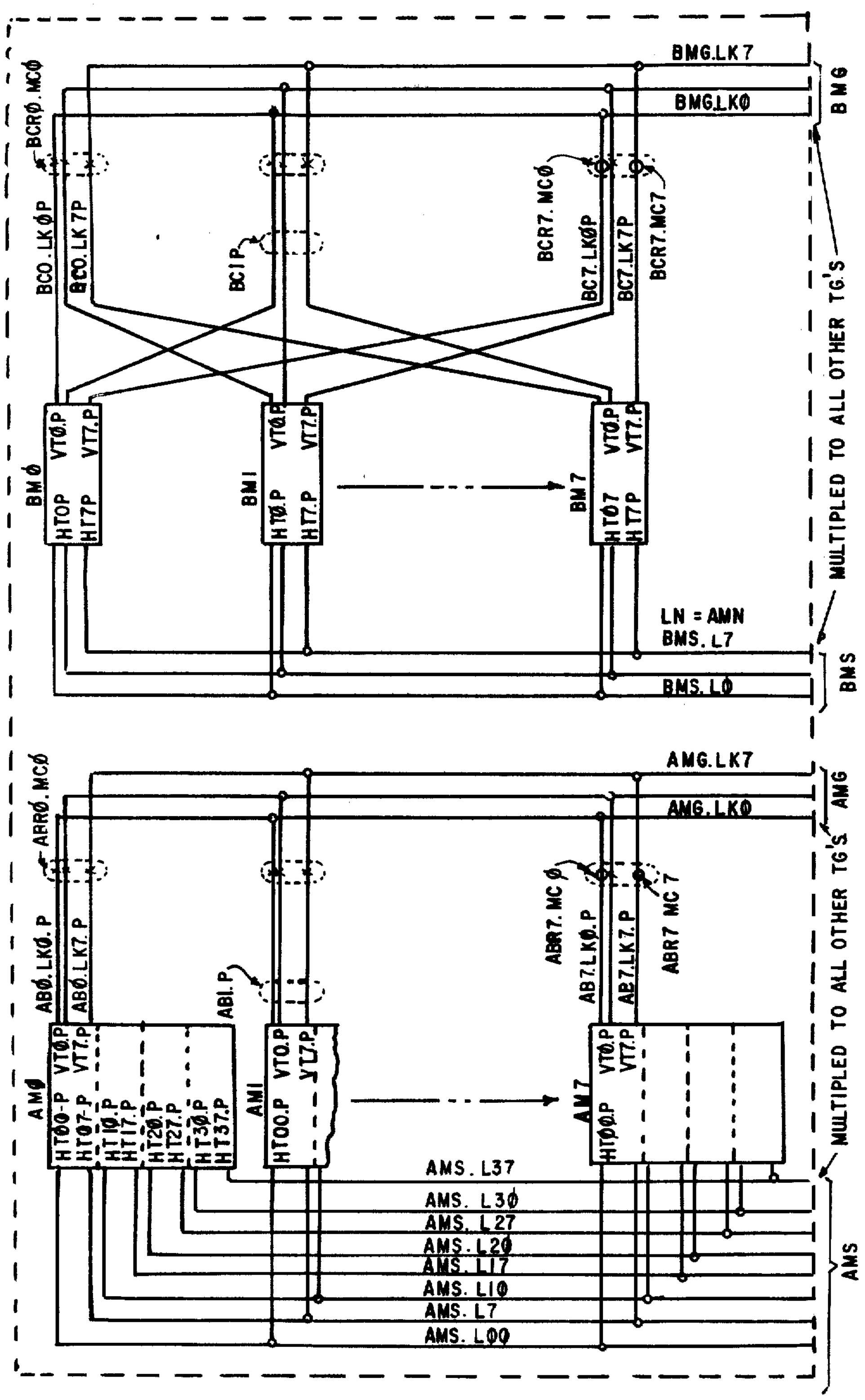

Considering now the pull path operation in greater detail with reference to FIG. 10, to establish a connection in the switching section, four crosspoint assemblies (one in each switching stage) must be pulled up by activating their pull windings. This operation takes place in a sequence of steps.

The steps for pullins any given AM and BM crosspoint assembly will be considered first. Inside an NU unit, an AM crosspoint assembly can be identified by the combination TGN, AMN (=ABN), HTN and VTN (=LKN). As an example, suppose it is desired to pull, in IG3, the crosspoint on AMØ which intersects HT Ø7 and VT 4.

Step 1. TG3.ABRØ is operated. Contacts MC* of the ABR group connect the ground side (or VT terminals) of all pull windings of the desired AM matrix to the eight-position AM ground bus AMG. This bus is shared by all TG groups in the NU unit and is channeled to the network controller.

Step 2. Crosspoint matrix pull path supply lead is enabled. As shown in FIG. 10, each AM pull horizontal terminal is wired to the correspondingly numbered lead of the AM supply bus AMS. This bus is shared by all TG groups in the NU unit. The network controller places supply voltage on the AMS bus lead selected by number HTN; in the present example: AMS.LØ7.

Step 3. Crosspoint matrix pull path ground lead is enabled. The network controller connects ground on the AMG bus lead selected by VTN (=LKN); in the present example: AMG.LK4. This operation completes a current path through the selected AM crosspoint assembly which is thereby pulled.

Inside an NU unit, a BM crosspoint assembly is designated by the combination: TGN, BMN (=LKN), HTN (=AMN) and VTN (=BCN=PGN). As an example, suppose it is desired to pull, in group TG4, the crosspoint on BM1 which intersects HT3 and VT6.

Step 1. TG4.BCR6 is operated. Contacts MC* of this BCR connect the ground side (or VT terminals) of the pull windings of all BM crosspoint assemblies that have access to a given link fo the desired BC link group to the corresponding lead of BM ground bus BMG. This bus is shared by all IG groups in an NU unit and is channeled to the network controller.

Step 2. Crosspoint matrix pull path supply lead is enabled. As shown in FIG. 10, each BM pull horizontal terminal is wired to the correspondingly numbered lead of the BM supply bus BMS. This bus is shared by all TG groups in the unit NU. The network controller places supply voltage on the selected BMS bus lead selected by HTN (=AMN); in the present example: BMS.L3.

Step 3. Crosspoint matrix pull path ground lead is enabled. The network controller places ground on the BMG bus lead selected by VTN (=LKN); in the present example: BMG.LK1. This completes a current path through the selected BM crosspoint assembly, which is thereby pulled.

Figure 11:
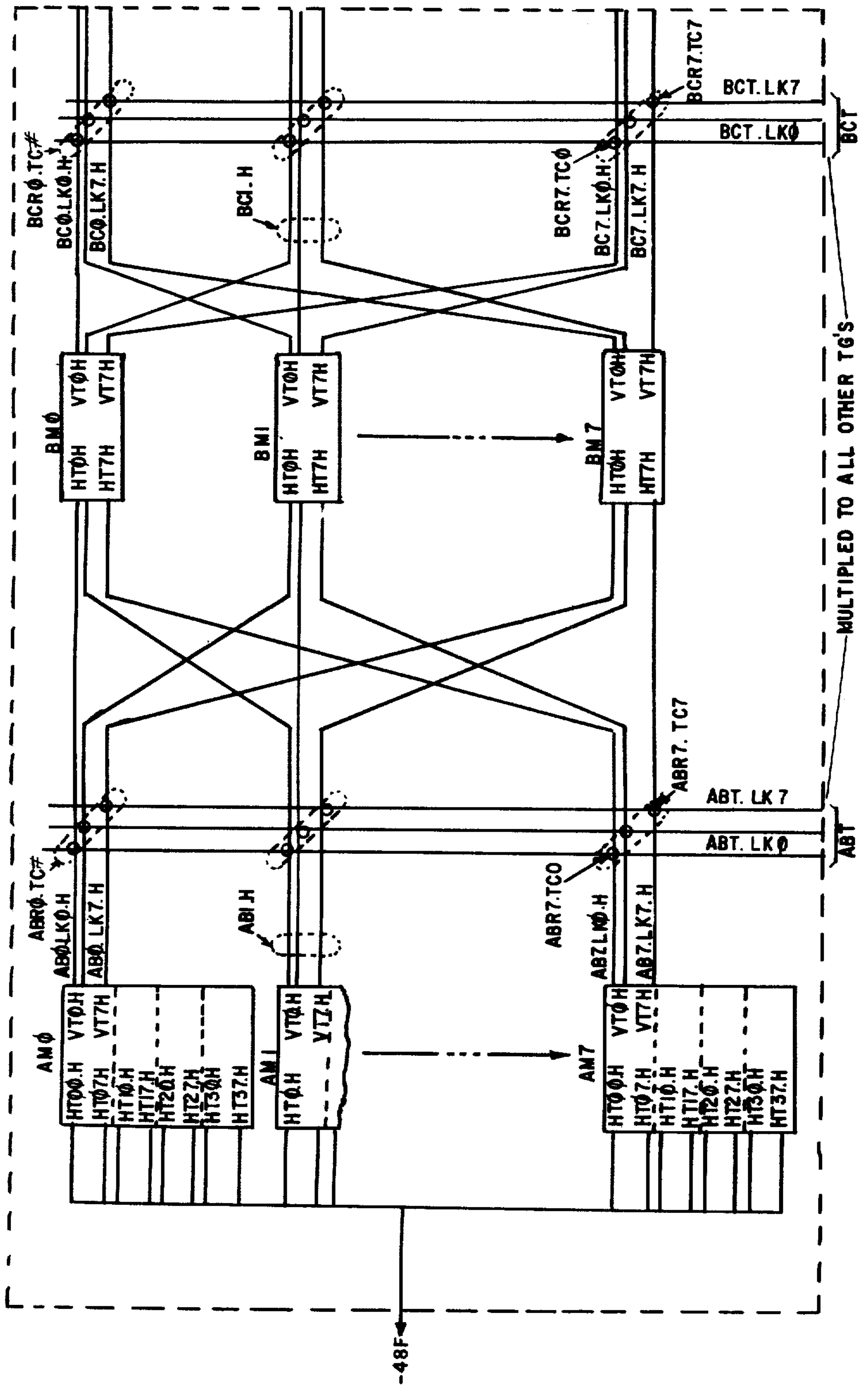

Considering now the hold path operations with reference to FIG. 11 of the drawings, once a network path is pulled (i.e., selected AM, BM, CM and DM crosspoints energized) a hold path is established through the network. In each crosspoint assembly, this path consists of a reed contact and hold winding in series. On the trunk side of the network, all "hold" terminals on the AM matrix horizontal are permanently wired to −48 volts. On the position side of the network, this path is closed to ground by a contact on a hold relay, HR.HC. Hence, the established network connection is maintained as long as HR remains operated.

The idle-busy status of the AB and BC link groups can be determined by sensing the conditions (negative potential if busy, open circuited if idle) on their hold leads.

As shown in FIG. 11, hold leads of each link in any desired AB link group can be connected to corresponding leads of the AB test bus, ABT via the test contacts TC* of the associated ABR. For example, when it is necessary to test conditions on AB link group AB6 of TG5, the network controller operates TG5.ABR6.

In a similar fashion, any BC link group is tested by operating the proper BCR, which connects the hold leads of the selected link group to the corresponding leads of BC test bus BCT.

Test buses ABT and BCT are shared by all TG's in a NU.

Figure 12:
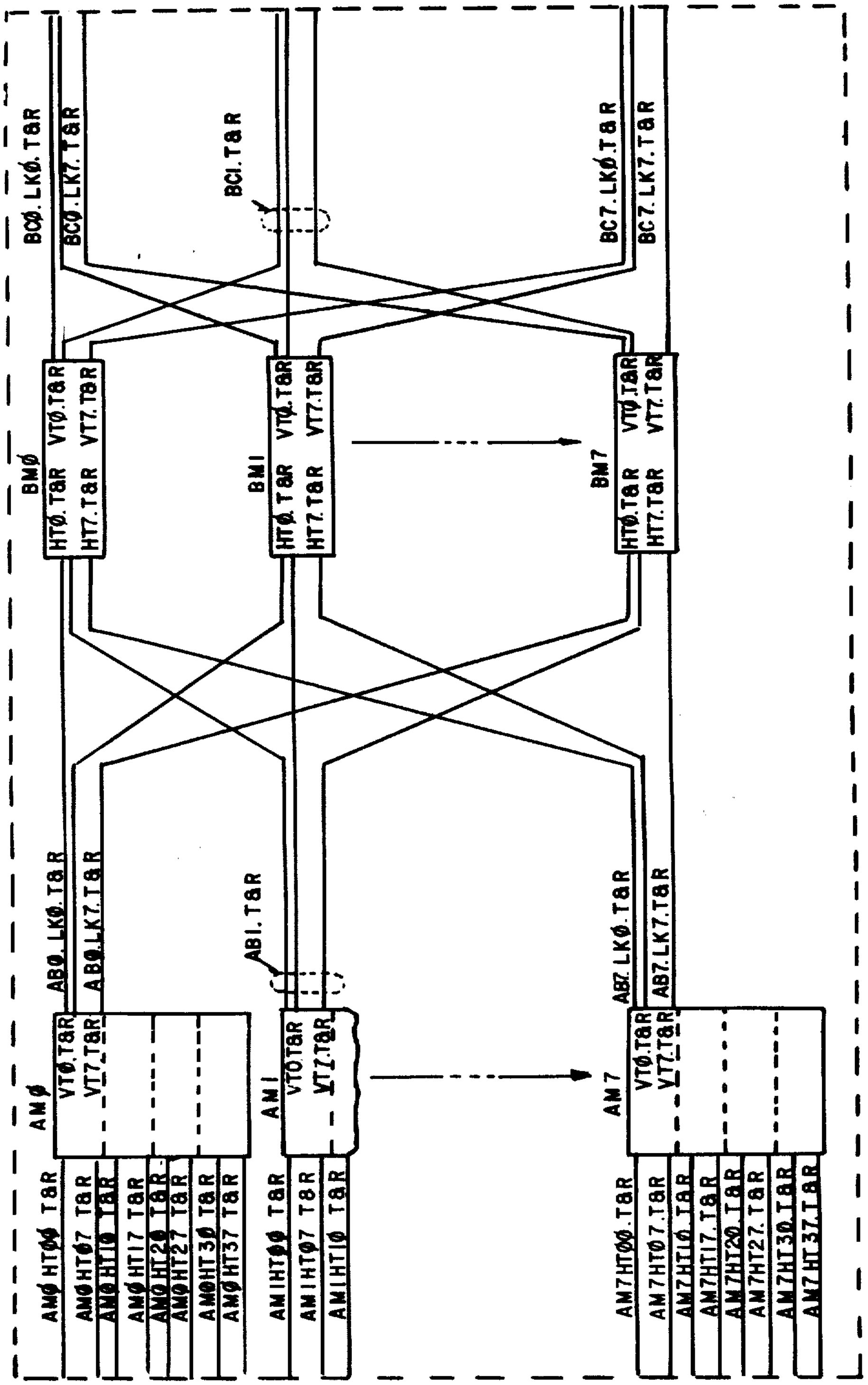

Considering now the audio path in greater detail with reference to FIG. 12 of the drawings, respectively the pull path and hold path operations close and hold both audio contacts, tip and ring (TC and RC) in each selected crosspoint assembly, one per trunk grid stage. This action establishes an audio connection across the trunk grid.

Equipment for detecting faults on the audio path is as follows:

1. Check audio path continuity, and
2. Detect the presence of a cross-connection between two independent audio paths.

Figure 13:
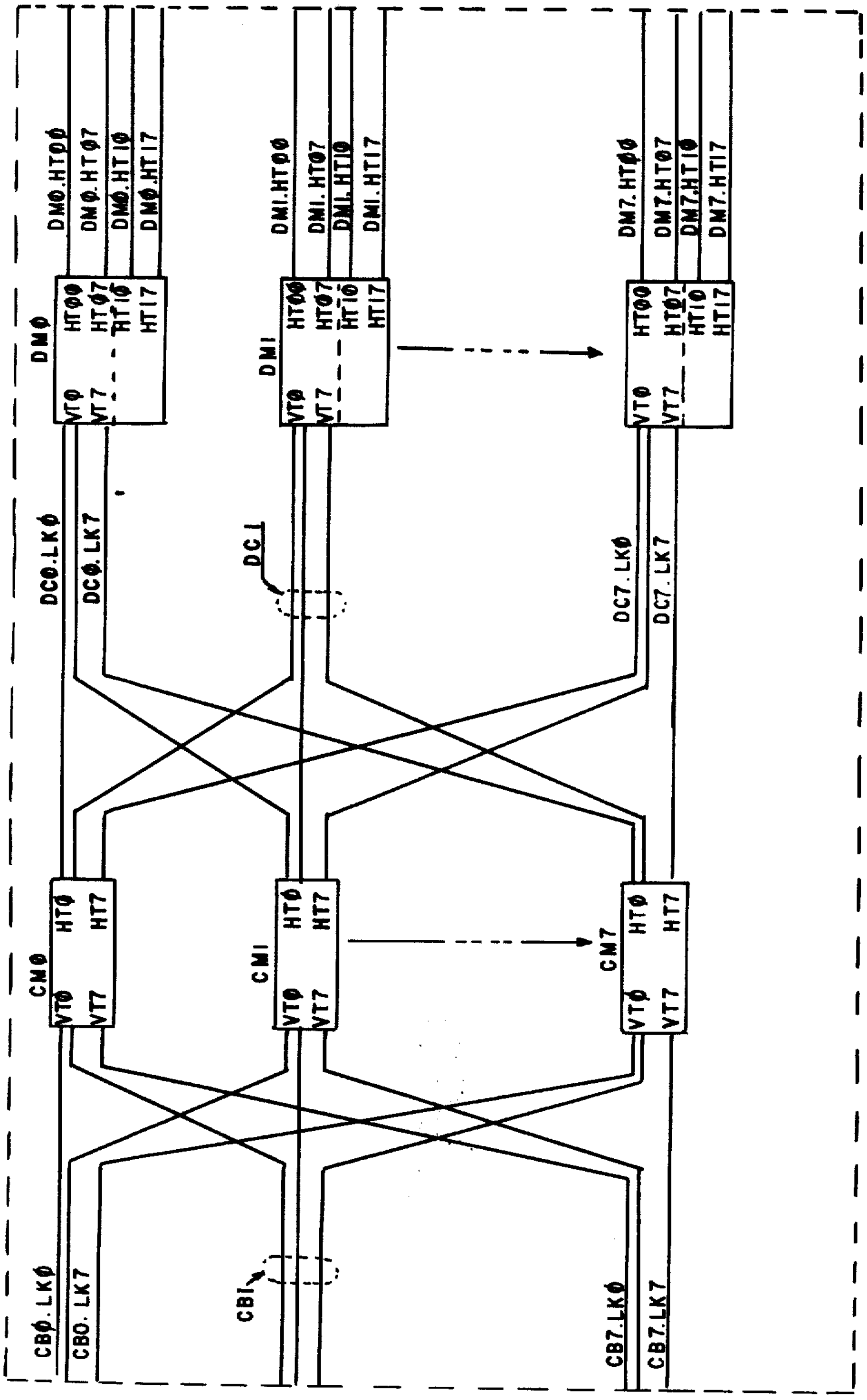

Referring now to FIG. 13, the position grids are the primary modules which in total comprise the C and D stages of the switching section. The position grid consists of eight C matrices CM, identified by a C matrix number CMN ranging from Ø through 7, and eight D matrices DM identified by a D matrix number DMN ranging from Ø through 7.

Each D matrix can accommodate four, eight, 12, or up to a maximum of 16 HT terminals, the exact number being dependent on the number of network units employed in the total system. The D matrix HT terminals are identified by a horizontal terminal number HTN ranging in the maximum case from ØØ through 17 (octal notation). There are 8 D matrix vertical terminals VT, designated by a vertical terminal number VTN ranging from Ø through 7.

For the implementation of the position grid matrices, 8 × 8 (eight horizontal, eight vertical) matrix subassemblies are utilized. While this basic size fulfills the requirements for all C matrices and all eight horizontal terminal (also four horizontal terminal) D matrices, expansion of the D matrix to 16 (also 12) requires the use of two sub-assemblies. By connecting identically numbered VT terminals in parallel, matrix sizes of 8 × 12 or 8 × 16 can be obtained.

Figure 14C:
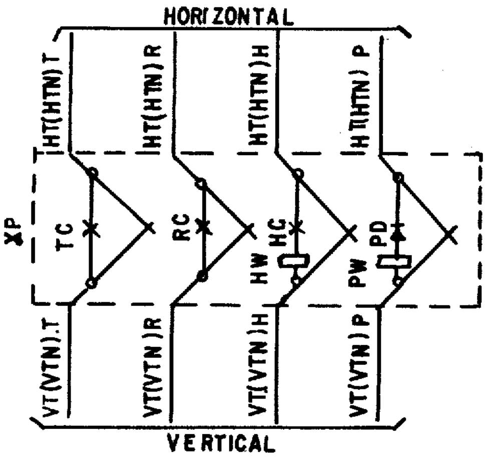
Figure 14B:
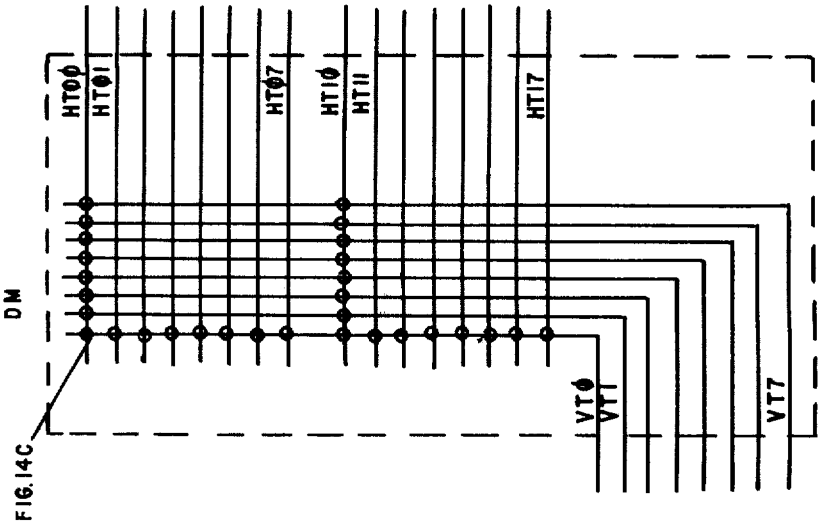
Figure 14A:
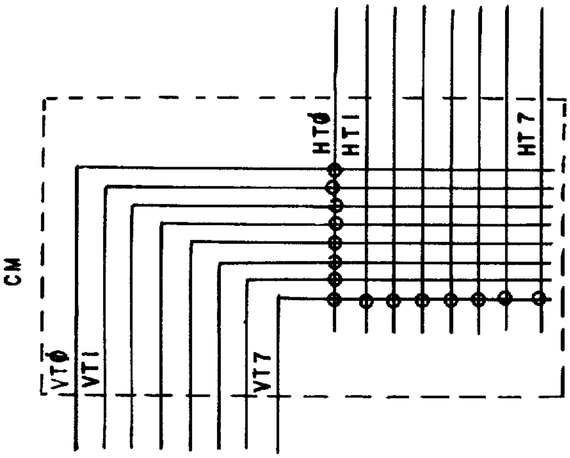

Considering now the position grid crosspoint assemblies in greater detail with reference to FIG. 14C, the crosspoint assemblies XP which make up the C and D matrices are identical (but different from those that are used in the A and B matrices, since the polarity of the hold winding HW is reversed). An individual crosspoint assembly is located at the intersection of a matrix horizontal and vertical and is identified by the respective horizontal terminal number and vertical terminal number XP (HTN, VTN).

Each crosspoint assembly consists of:

1. A pull winding and series diode to operate all contacts within the assembly.
2. A hold winding and series contact to latch the assembly.

3. Two contacts which actually switch the tip and ring (T and R) leads of the audio pair.

Referring again to FIG. 13, the link groups and links will now be considered in greater detail, starting with the CB link group. Within each position grid, there are eight CB link groups which access the trunk grids of the switching section. A CB link group is formed by grouping one vertical terminal VT from each of the eight C matrices, these VT terminals having identical VT numbers. Each link group is designated by a CB link group number CBN which is identical in number to the VT terminals which form it and also identical in number to the trunk grids to which the link group is connected. The range of the CBN number therefore, is from Ø through 7.

CBN = VTN (C matrix) = TGN

Example: CB7 is composed of the number 7 vertical terminal from each of the eight C matrices. This link group is connected to TG7.

Each CB link group is composed of eight links LK, identified by a link number LKN ranging from Ø through 7. The LKN numbers are identical to the number of the C matrix from which they emanate and also to the number of the B matrices to which the respective links are connected. The B matrices have been discussed previously in this section.

LKN = BMN = CMN Ø ≤ N ≤ 7

Example: CB5.LKØ is the link from CMØ to BMØ of TG5. This link is part of link group CB5.

Within each position grid, there are eight DC link groups which interconnect the C and D matrices. A DC link group is formed by grouping the eight vertical terminal VT emanating from one D matrix. Each group is designated by a DC link group number DCN which is identical to the number of the D matrix withe which it is associated. Thus the range of the DCN is from Ø through 7.

DCN = DMN Ø ≤ N ≤ 7

Example: DC6 is composed of the eight VT terminals of D matrix 6, DM6.

Each DC link group is composed of eight links LK identified by a link number LKN, ranging from Ø through 7. The LKN numbess are identical to the number of the C matrix from which they emanate and also to the number of the D matrix VT terminals to which the respective links are connected.

LKN = CMN = VTN (D matrix) Ø ≤ N ≤ 7

Example: DC3.LK4 is the link from DM3 to CM4. This link is part of link group DC3.

Figure 15:
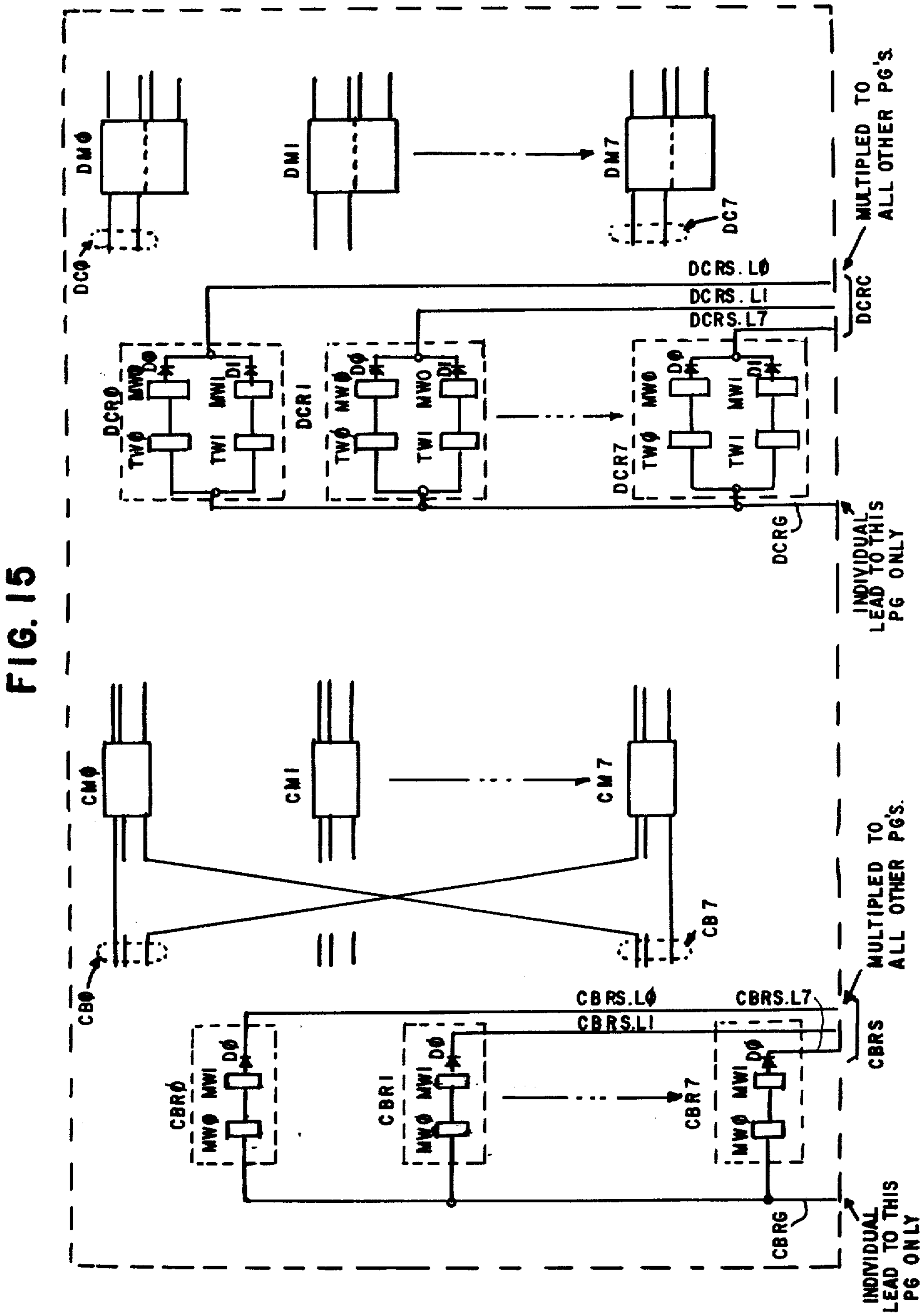

Considering now the mark/test relays in greater detail with reference to FIG. 15, permanently assigned to each DC link group, within a trunk grid, is an individual mark/test relay group, DCR. Each DCR group is designated by a relay group number DCRN, which is identical in number to the link group with which it is associated.

DCRN = DCN = DMN Ø ≤ N ≤ 7

Because no further information can be obtained beyond that supplied by the BC link group test function (BC and CB hold path link groups being directly connected) the CB hold path link group does not contain a test function. However, the marking function is necessary. For this reason, relays, simply called mark relay groups, are permanently assigned to each CB pull path link group. Each mark relay group is designated by a relay group number, CBRN, which is identical in number to the link group with which it is associated.

CBRN = CBN = CMN = VTN (C matrix) = TGN Ø ≤ N ≤ 7

Each DCR group contains two sets of eight contacts, while the CBR group contains only one set of eight contacts. One set of the DCR contacts and the only set of the CBR contacts perform a switching function in the pull path of the corresponding link group. This set of contacts is called the mark contact set MC*. Each contact set is composed of two sets of four contacts and their associated coils MW0 and MW1.

The relay assignments in the preferred embodiment of the present invention for the CBR groups are as follows:

| Relay Location | Winding Designation | Contact Designation | |
|---|---|---|---|
| Card Ø | MWØ | MC0 - MC3 | MC |
| Card Ø | MW1 | MC4 - MC7 | |

The relay assignments for the DCR group are the same as for the ABR and BCR groups.

The second set of eight contacts in the DCR group performs a switching function in the hold path of the corresponding DC link group. This set of contacts is called the test contact set TC*. Each set is composed of two sets of four contacts and their associated coils TWØ and TW1. The two sets of four are mounted on different cards.

The relay assignments for the DCR groups are the same as for the ABR and BCR groups.

Each singular contact in either the mark contact set or the test contact set corresponds to the individual links within the proper link group.

MCN = TCN = LKN Ø ≤ N ≤ 7 (DC link group)

MCN = LKN, Ø ≤ N ≤ 7 (CB link group)

Examples:

1. CBR6.MC3: Contact is connected to the position grid pull path, specifically LK3 of CB link group six.

2. DCR5.TC3: Contact is connected to the position grid hold path, specifically LK3 of DC link group five.

FIG. 15 shows one position grid. Therefore it is sufficient to designate the CBR and DCR groups as shown (e.g., CBRØ - CBR7; DCRØ - DCR7). When it is necessary to designate a CBR group or DCR group within an entire NU unit, a prefix is used as shown in the following examples:

PG2.CBR4 = CBR4 in PG2

PG5.DCR1 = DCR1 in PG5

There is a need to oeprate only one CBR group in an entire NU unit at any given time. Note from FIG. 15 that the ground sides of CBRØ through CBR7 are wired together to CBRG (CBR ground lead). Each PG group has a separate CBRG lead. To distinguish these leads in various PG groups a prefix is employed as in this example:

PG1.CBRG = CBRG lead of PG1

The supply side of each CBR group is wired to the correspondingly numbered lead on the CBR supply bus CBRS. This bus is shared by all PG groups in a NU unit.

To operate, for example, PG6.CBR3, the network controller places supply voltage on CBRS.L3 and ground on PG6.CBRG.

A similar matrix arrangement exists for the DCR groups in an NU unit. Ground wires DCRG are individual per PG group and supply bus DCRS is common for all PG groups. This allows one-at-a-time operation of any DCR group in an NU unit. Example: To operate PGØ.DCR2, place supply voltage on DCRS.L2 and ground on PGØ.DCRG.

Figure 16:
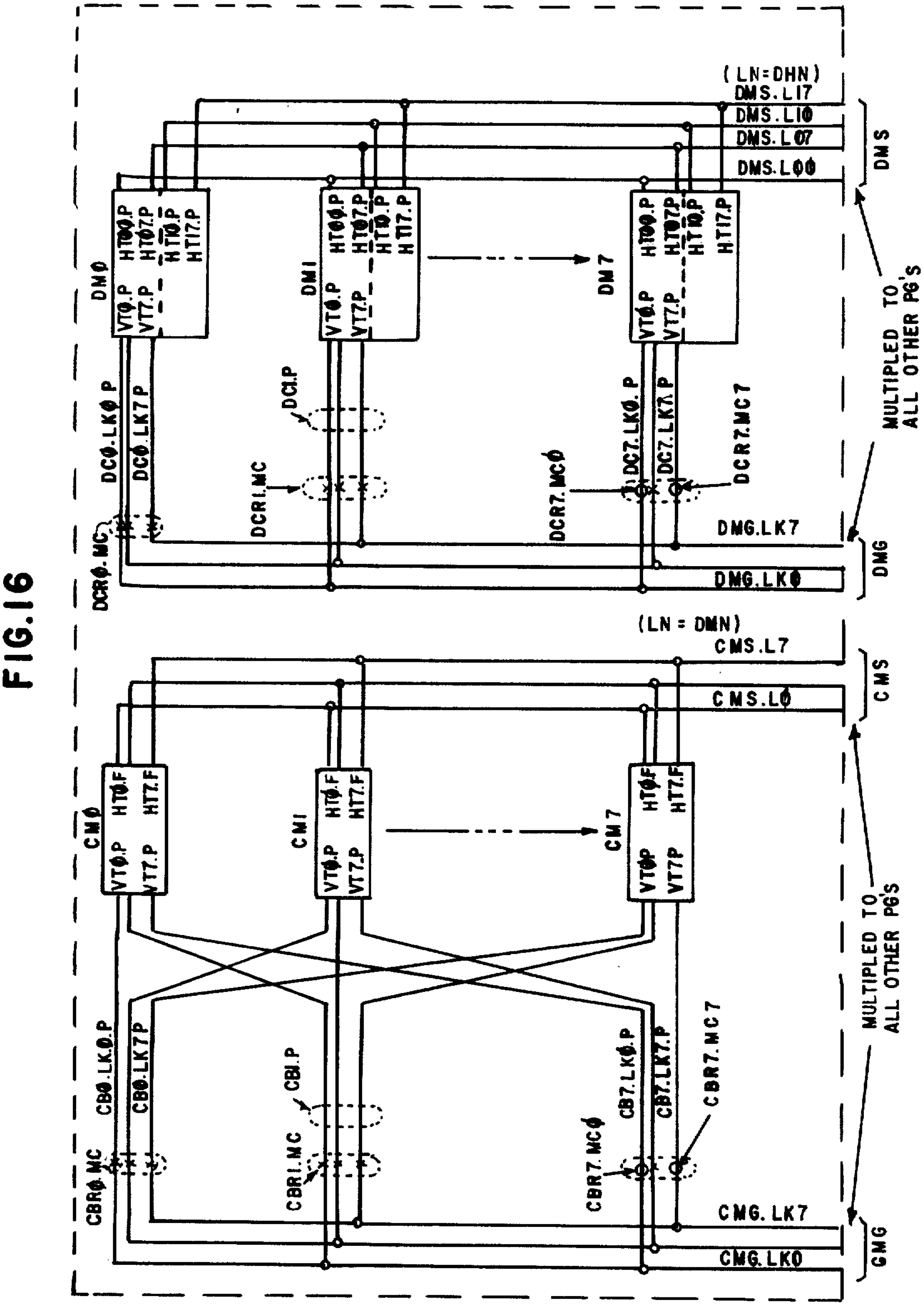

As shown in FIG. 16, the pull path operation will now be considered in greater detail. To establish a connection in the switching section, crosspoint assemblies (one in each switching stage) are pulled by activating their pull windings. This operation takes place in a sequence of steps.

The steps for pulling any given CM and DM crosspoint assembly will now be considered.

Inside an NU unit, a CM crosspoint assembly is identified by the combination PGN, CMN (=LKN), VTN (=CBN), and HTN (=DMN) numbers. As an example, suppose it is desired to pull, in PG2, the crosspoint on CMØ which intersects VT6 and HT3.

Step 1. PG2.CBR6 is operated. Contacts MC* of this CBR group now connect the ground side of the pull windings of all CM crosspoint assemblies that have access to a given link of the desired CB link group to the corresponding lead of CM ground bus CMG. This bus is shared by all PG groups in an NU unit and is channeled to the network controller.

Step 2. Crosspoint matrix pull path supply lead is enabled. As shown in FIG. 16, each CM pull horizontal terminal is wired to the correspondingly numbered lead of the CM supply bus CMS. This bus is shared by all PG groups in the NU unit. The network controller places supply voltage on the selected CMS bus lead selected by HTN (=DMN); in our example: CMS.L3.

Step 3. Crosspoint matrix pull path ground lead is enabled. The network controller places ground on the CMG bus lead selected by VTN (=LKN); in the present example: CMG.LK6. This completes a current path through the selected CM crosspoint assembly for pulling purposes.

Inside an NU unit, a DM crosspoint assembly is identified by the combination PGN, DMN (=DCN), VTN (=LKN) and HTN. As an example, suppose it is desired to pull in PG2, the crosspoint on DM4 which intersects VTØ and HT14.

Step 1. PG2.DCR4 is operated. Contacts MC* of this DCR now connect the ground side (or VT terminals) of all pull windings of the desired DM to the eight position DM ground bus, DMG. This bus is shared by all PG groups in the NU unit and is channeled to the network controller.

Step 2. Crosspoint matrix pull path supply lead is activated. It should be noted that in FIG. 16 each DM pull horizontal terminal is wired to the correspondingly numbered lead of the DM supply bus DMS. This bus is shared by all PG groups in the NU unit. The network controller places supply voltage on the DMS bus lead selected by HTN, which in the present example is DMS.L14.

Step 3. Enable crosspoint matrix pull path ground lead. The network controller places ground on the DMG bus lead selected by VTN (=LKN); in our example: DMG.LKØ. This completes a current path through the selected DM crosspoint assembly, which pulls up.

Figure 17:
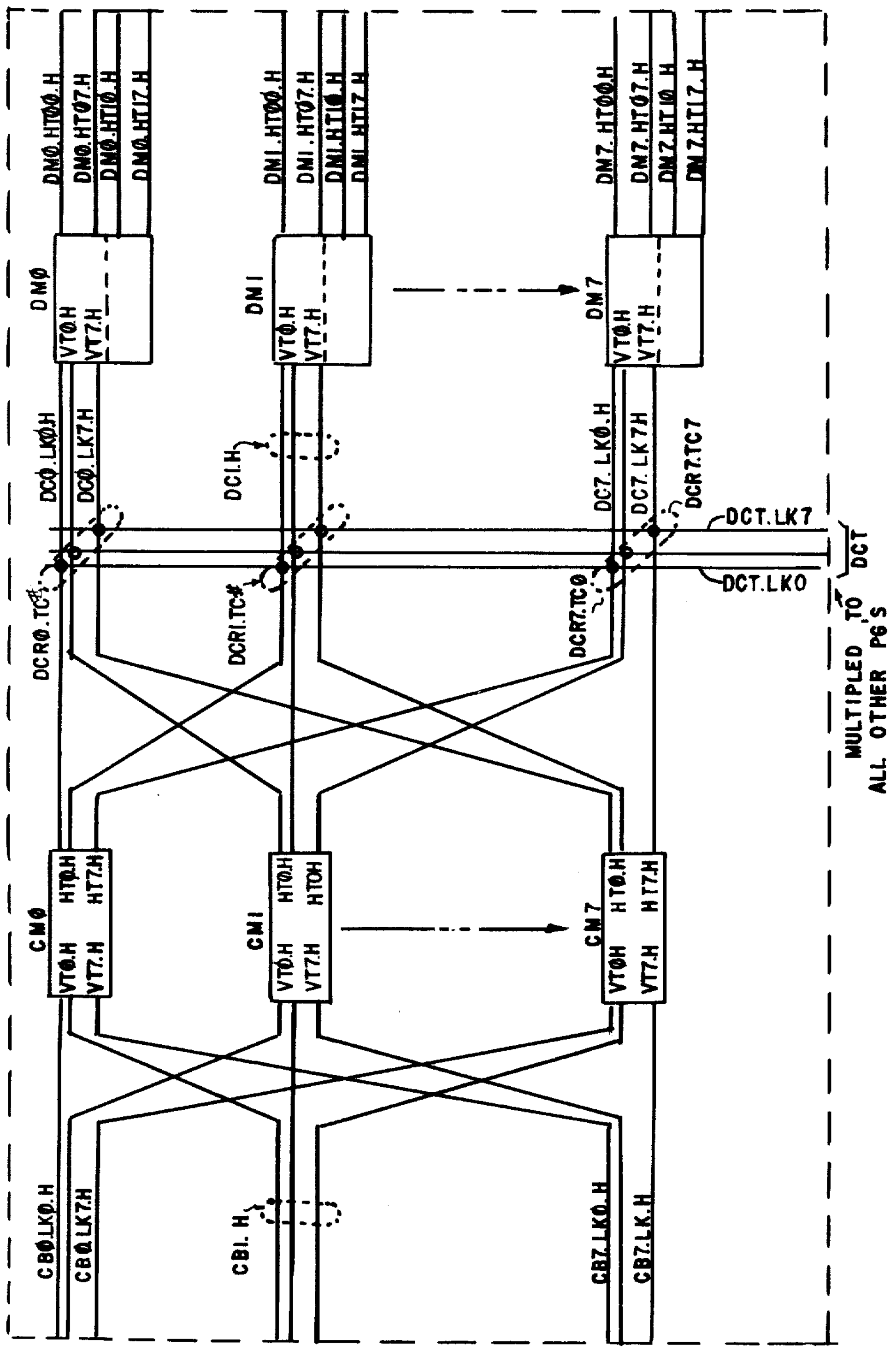

Considering now the hold path operation in greater detail with reference to FIG. 17, the PG groups form the CM and DM crosspoint portion of the hold path. The DM horizontals are wired directly to the hold relays HR.

The idle-busy status of the DC link group is determined by sensing the conditions (negative potential if busy, open circuited if idle) on its hold leads. Hold leads of each link in any desired DC link group can be connected to corresponding leads of DC test bus DCT via the test contacts TC* of a DCR. For example, when it is necessary to test conditions on DC link group DC3 of PG2, the network controller must operate PG2.DCR3. Test bus DCT is shared by all PG groups.

Since the CB and BC link groups are identical to one another, the CB hold path link group does not have a test function.

Figure 18:
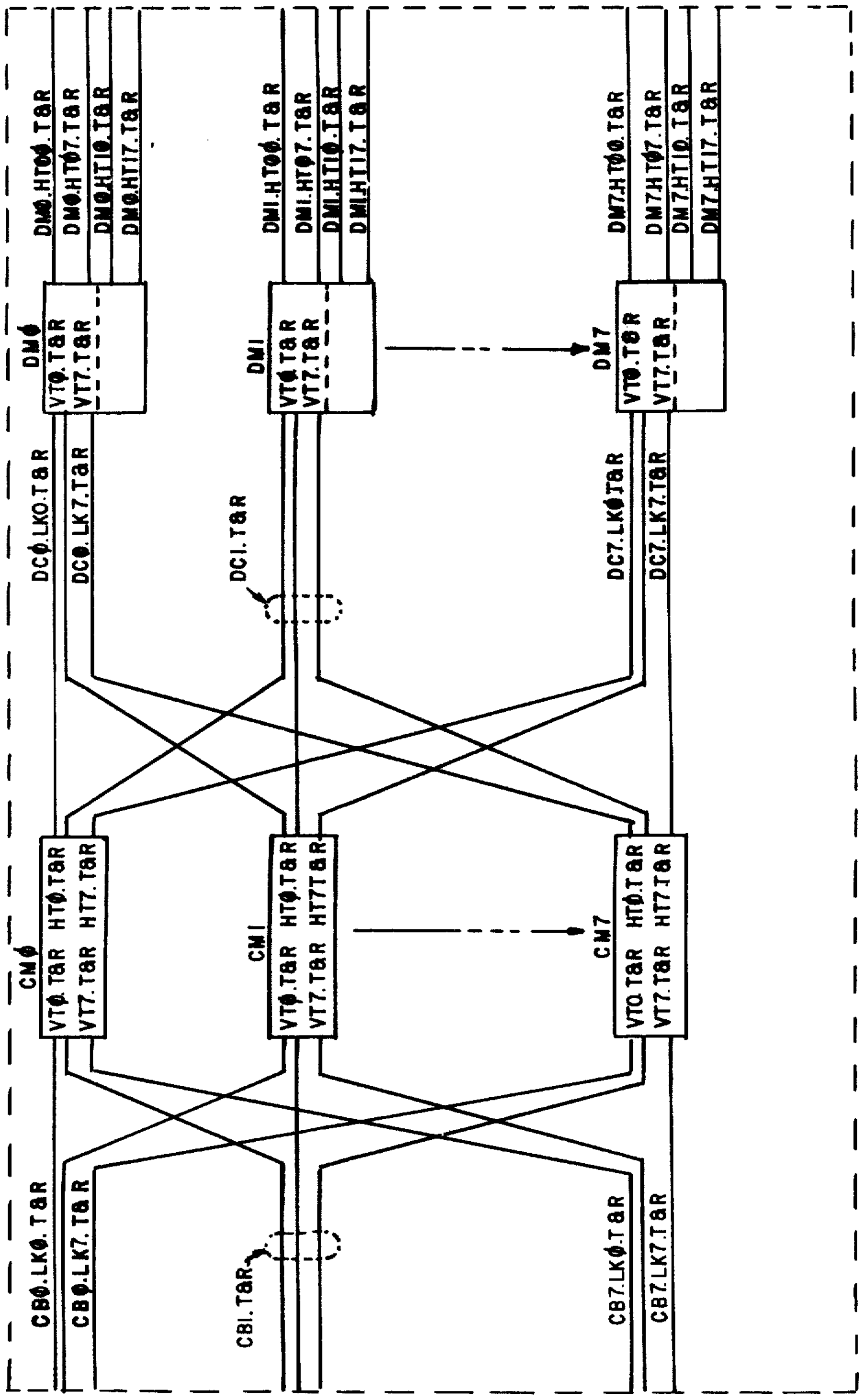

Referring now to FIG. 18, considering the audio path, respectively the pull path and hold path operations close and hold both audio contacts, tip and ring TC and RC in each selected crosspoint assembly, one per position grid stage. This action establishes an audio connection across the position grid.

Equipment for detecting faults on the audio path includes audio path continuity circuits, and circuits for detecting the presence of a cross-connection between two independent audio paths.

NETWORK ACCESS MATRIX UNIT

Referring now to FIGS. 5 and 24, each network unit and its associated hold relays are under program control and supervision by means of a pair of network access matrices NAM. A complete network complex contains a maximum of eight NAM matrices which in total comprise the network access matrix unit NAMU.

The NAM matrix is a hybrid matrix. It contains a mexture of SMP sense points and CMP control points, arranged in 16 words of 32 points each.

Figure 25:
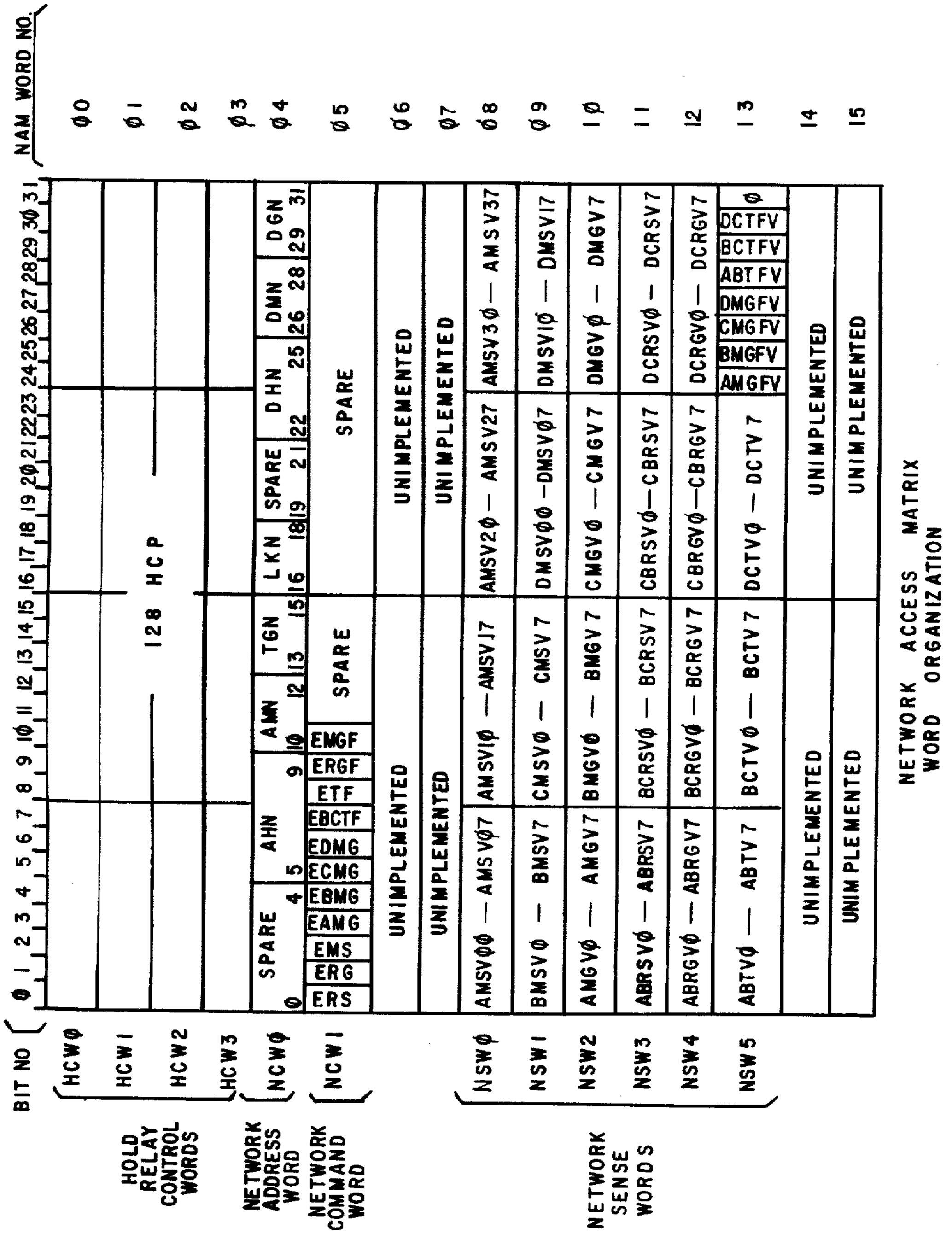
Figure 2C:
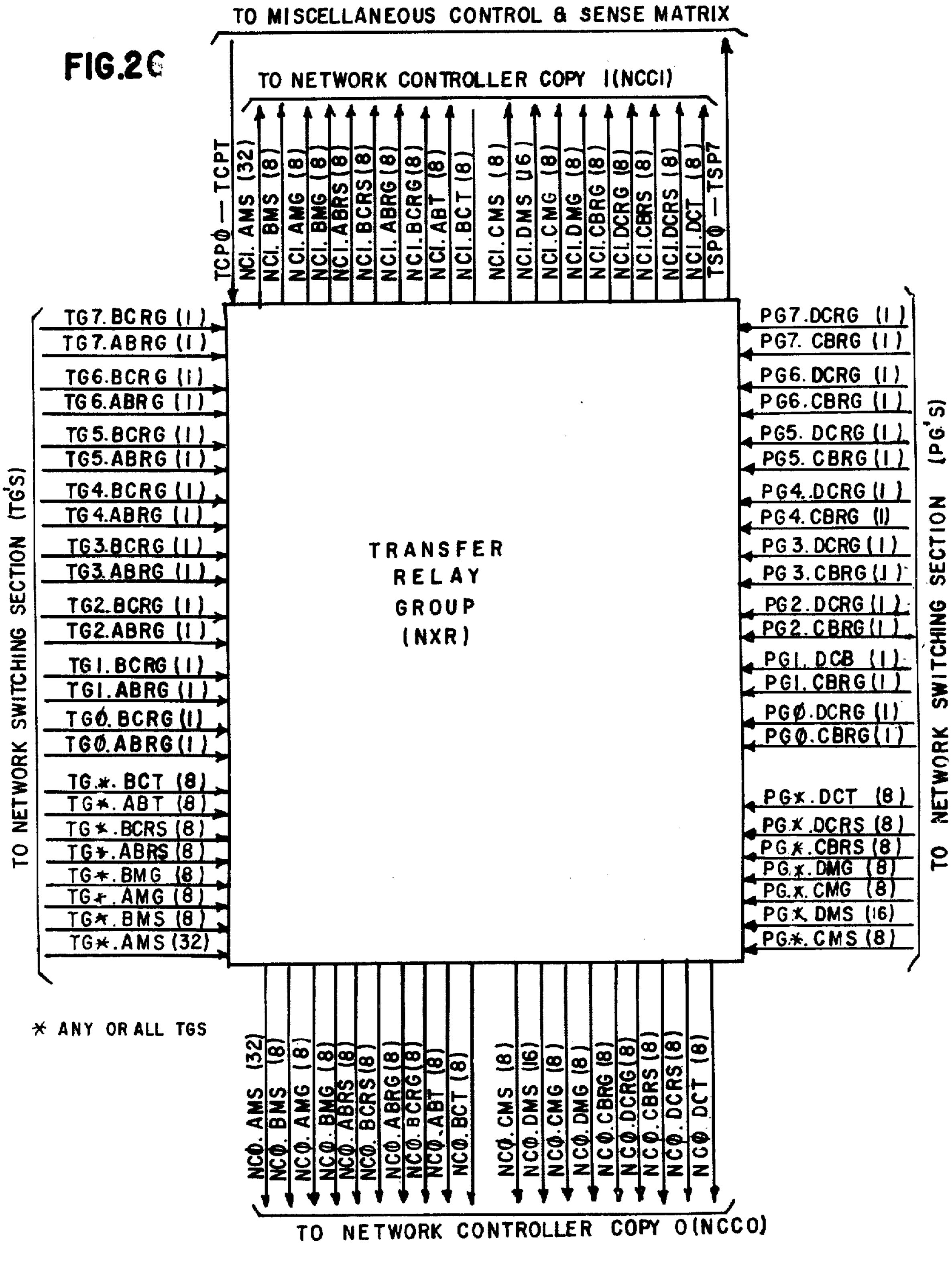

Considering now the network address and command words with reference to FIG. 25, NAM words Ø4 and Ø5 are designated network control words NCWØ and NCW1 respectively. NCWØ is the network address work; NCW1 is the network command work. Further identification of the NCW words is obtained by prefixing them with the NCC number and the NU number as required.

Example: NU3.NCC1.NCWØ is NCWØ of NCC1 belonging to NU3.

The network address work NCWØ is divided into halves, each half containing address data on an octal basis. The left half essentially contains the network trunk terminal number NTTN. The network unit number need not be stored in this word. The right half contains the complete network position terminal number NPTN as well as the number of the idle link LKN which is selected by the program to establish a connection between an NTT terminal and an NPT terminal.

The network command word NCW1 is also divided into halves: the right half is unused; the left half is organized as follows:

| NCW1 (NAMW5) Bit Number | CMP Mnemonic | Command Description |
|---|---|---|
| 00 | ERS | Enable mark/test relay supply gates |
| 01 | ERG | Enable mark/test relay ground gates |
| 02 | EMS | Enable X-Pt matrix pull path supply gates |
| 03 | EAMG | Enable A matrix pull path ground gates |
| 04 | EBMG | Enable B matrix pull path ground |

-continued

| NCW1 (NAMW5) Bit Number | CMP Mnemonic | Command Description |
|---|---|---|
| | | gates |
| 05 | ECMG | Enable C matrix pull path ground gates |
| 06 | EDMG | Enable D matrix pull path ground gates |
| 07 | EBCTF | Enable BC link test fault gate |
| 08 | ETF | Enable all link test fault gates |
| 09 | ERGF | Enable mark/test relay ground fault gate |
| 10 | EMGF | Enable X-Pt matrix ground fault gate |
| 11 through 15 — Unused spare bits | | |

Commands EAMG, EBMG, ECMG, and EDMG taken collectively are referred to as EMG. This notation may be desirable for call processing use. The separate commands are used primarily in maintenance operations. See part 3.

Network sense words NAM words ø8 through 13 contain the associated NU unit supervisory information. These six words are designated network sense words NSWø through NSW5, 191 of the 192 SMP sense points in this group supervising a particular voltage level in the NU unit, as indicated in FIG. 25.

Bit 31 of NSW5 is held at a fixed 0.

Hold relay control words NAM words øø through ø3 contain 128 CMP control points for control of 128 hold relays. These four words are designated hold relay control words HCWø through HCW3.

Since each of the four HCW words contains 32 CMP control points, a maximum of 256 hold relays can be controlled by each pair of NAM matrices. A NAMU unit consisting of eight NAM matrices is therefore required for a network complex which is fully equipped with 1024 NPT terminals.

The assignment of the individual CMP control points within each HCW word is described hereinafter and shown in FIG. 31.

Matrix NAM words ø6, ø7, 14, and 15 are not implemented with hardware, but if desired, they can be implemented as control and/or sense words in any combination.

NETWORK CONTROLLER SECTION

Referring now to FIG. 5, the network controller section, which is an integral part of the NU unit, consists of:

a. two identical network controllers NCCø and NCC1;

b. one transfer relay group NXR; and c. one hold path battery disconnect circuit NBH.

Each one of the two NCC controllers is under complete program control and supervision and does not contain independent decision-making hardware circuits. The program control is performed by two sets of dedicated control matrix points CMP, one set per NCC controller. The program supervision is performed by two sets of dedicated sense matrix points SMP, also one set per NCC controller.

The network access matrix unit NAMU contains the CMP control points and SMP sense points for the network controller copies and the hold relay unit.

The transfer relay group NXR, consisting of a group of parallelly operated relays, is under program control via a set of eight CMP control points. The operation of the NXR group is monitored via a set of eight SMP sense points, one SMP point per relay printed circuit board.

The NXR group allows either one of the NCC controllers to be connected to the switching section. The NCC controller connected to the switching section is defined to be in the ACTIVE mode and is able to perform all control and supervisory functions necessary for the operation and maintenance of the switching section by means of its CMP points and SMP points. The NCC controller which is not connected to the switching section is defined to be in the STANDBY mode. In this mode the NCC controller is still able to receive program commands via its CMP points. These commands do not result in any network switching section action; however, its SMP points can be monitored. This provides the network controller with the capability of being routined in a standby condition.

The NXR group is defined to be in state "1" when its relays are operated; it is in state "0" when they are not operated. The relation between the state of NXR group and the mode of the NCC controllers is as follows;

| State of | NXR | NCC0 | NCC1 |
|---|---|---|---|
| | ø | ACTIVE | STANDBY |
| | 1 | STANDBY | ACTIVE |

Each hold path battery disconnect circuit NBH consists of a set of two relays (not shown), physically collocated with a NXR group. The NBH group however, is functionally a part of the audio test equipment.

Figure 19:
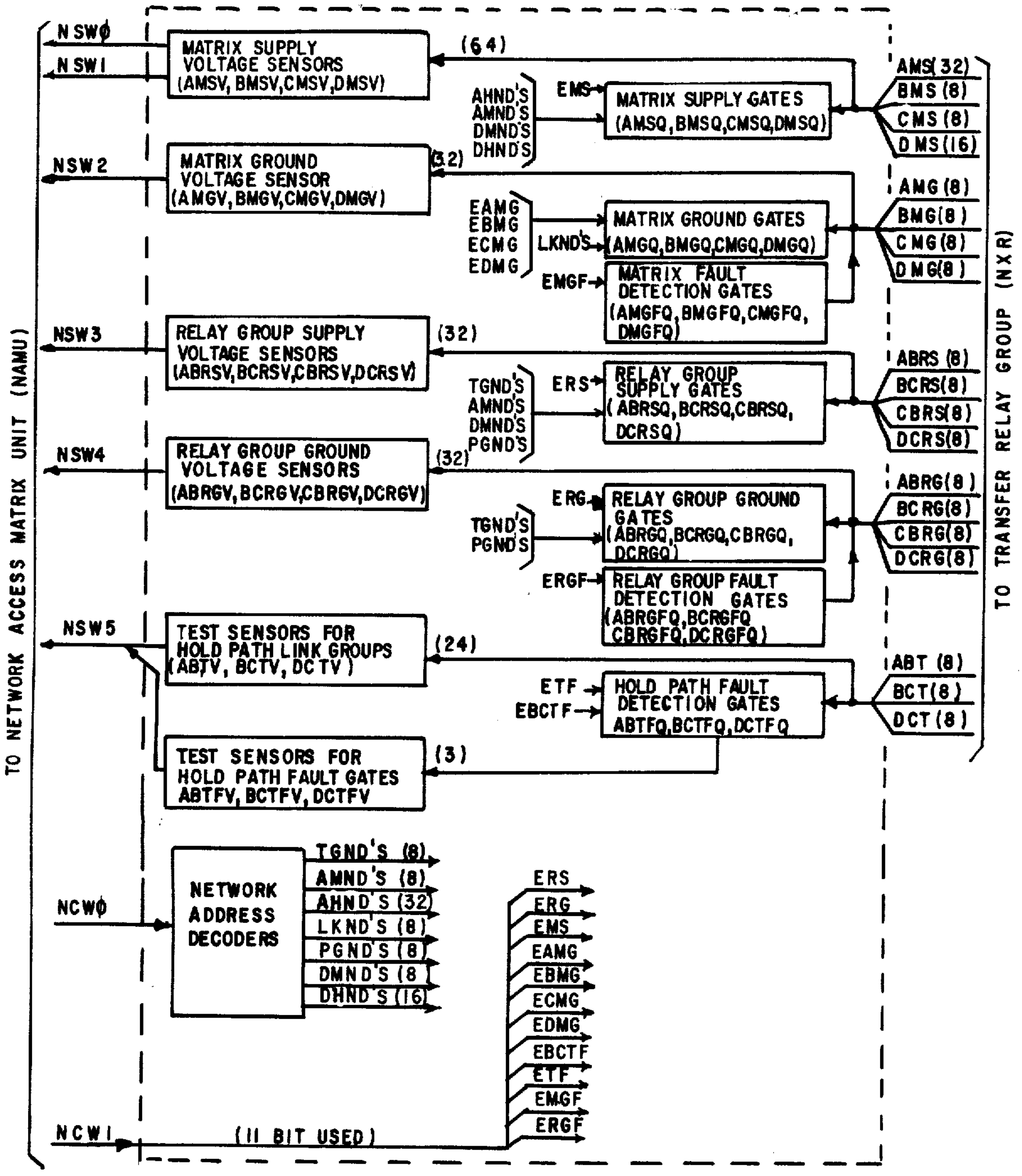

Referring to FIG. 19, a network controller is functionally divided into a controlling section and a sensing section.

The task of the controlling section is to transform command address information received from the CMP points into control and test potentials to be applied to relays and crosspoints in the switching section.

The task of the sensing section is to interrogate voltage levels in the switching section and to translate these into logic levels which are sensed by individual SMP points.

The logic functions of a network controller are implemented in the preferred form of the invention with +12 volt high threshold logic.

The controlling section of the controller consists of a group of seven decoders labeled TGND, AMND, AHND, LKND, PGND, DMND and DHND. Each decoder decodes the octal number contained in its associated address field of NCWø and provides a "one out of $n$" signal accordingly as shown in FIG. 20. There is also provided various groups of control and fault detection gates which are able to provide potentials to operate crosspoints and relays in the switching section, or to apply test potentials to check the proper performance of the switching section.

Control gates are designated by SQ and GQ respectively. SQ gates provide a negative supply potential; GQ gates a ground potential. Fault detection gates are designated by FQ; they provide a current-limited test potential. Operational criteria for the three types of gates are shown in FIG. 21.

Functionally the following groups of control and fault detection gates are required. The logic operate condition of each individual gate is shown in FIG. 22.

The matrix supply gates are operated under control of the EMS command and their corresponding address decoder outputs. They provide a –48 volt potential to the pull supply leads of the matrices in the A, B, C, and D stages. There are four groups of gates, one per matrix stage, which are designated AMSQ, BMSQ, CMSQ, and DMSQ. The number of gates per group is 32, eight, and 16 respectively.

The matrix ground gates are operated under control of an EMG (enable matrix ground) command and their corresponding link number decoder output. Taken collectively, these commands are referred to as EMG. The individual commands are: EAMG for stage A; EBMG for stage B; ECMG for stage C; and EDMG for stage D.

The matrix ground gates provide, via the mark contacts, a ground potential to the pull leads of the AB, BC, DB, and DC link groups and cause one crosspoint in each of the four stages to be pulled. There are four groups of gates, one per matrix stage, designated AMGQ, BMGQ, CMGQ and DMGQ. Each group consists of eight gates, one gate per link number.

The relay group supply gates are operated under control of the ERS command and their corresponding address decoder output. They provide a –48 volt potential to the supply leads of the ABR, BCR, CBR and DCR matrix arrays. There are four groups of gates, one per matrix array, which are designated ABRSQ, BCRSQ, CBRSQ and DCRSQ. Each group consists of eight gates.

The relay group ground gates are operated under control of the ERG command and their corresponding address decoder output. They provide a ground potential to the ground leads of the ABR, BCR, CBR and DCR matrix arrays. There are four groups of gates which are designated ABRGQ, BCRGQ, CBRGQ and DCRGQ. Each group contains eight gates.

The matrix fault detection gates are operated under control of the EMGF command. They provide a current limited potential to the respective matrix pull path ground buses for maintenance purposes. There are four such gates, one per matrix stage, designated AMGFQ, BMGFQ, CMGFQ and DMGFQ.

The relay group fault detection gates are operated under control of the ERGF command. They provide a current limited potential to the respective mark/test relay ground leads for maintenance purposes. There are four such gates, one per matrix stage, designated ABRGFQ, BCRGFQ, CBRGFQ and DCRGFQ.

The hold path fault detection gates provide a current limited potential to the test leads of the AB, BC, and DC link groups. Three such gates are required; their control is via either the call processing or maintenance program signals. Signals ABTFQ, BCTFQ, and DCTFQ are under control of the ETF command, for maintenance purposes, and the BCTFQ command is under control of either the EFT command, for maintenance purposes, or the EBCTF command. In the latter case, this gate is used to verify the release of the crosspoint hold contacts in the B and C matrices.

The sensing section of the NCC controllers includes groups of voltage sensors which provide a logic 1 output level when their required sense criteria are met. Voltage sensors are designated by the following notations: SV (supply voltage sensor); GV (ground voltage sensor); TV (test voltage sensor). The sense criteria for these sensors are specified in FIG. 23.

Functionally, the following groups of voltage sensors are required. The assignment of the individual sensor outputs to the NSW words is shown in FIG. 25.

The test voltage sensors for the hold path link groups are sensors which monitor the busy/idle condition of the hold leads of the AB, BC, and DC link groups. There are three groups of sensors, which are designated ABTV, BCTV, and DCTV. Each group consists of eight sensors, one per link number.

The matrix supply voltage sensors are sensors which monitor the voltage on the pull path supply leads for each of the matrix stages. Their main purpose is to check the condition of the matrix supply gates as well as the condition of the matrix diodes. There are four groups of sensors, which are designated AMSV, BMSV, CMSV, and DMSV. The number of sensors per group is the same as the number of matrix supply gates per stage which is 32, eight, eight and 16 respectively.

The matrix ground voltage sensors are sensors for monitoring the voltage on the pull path ground leads for each of the four matrix stages. Their main purpose is to check the condition of the matrix ground gates, the link number decoder, the link group mark contacts, the matrix coils, the matrix diodes, and the pull resistors. There are four groups of sensors, which are designated AMGV, BMGV, CMGV and DMGV. Each group contains eight sensors, one per link number.

The relay supply voltage sensors are sensors which monitor the voltage on the supply leads for each of the four matrix arrays of the mark/test relay groups. The sensors provide means to check the performance of the mark/test relay supply gates as well as the matrix diodes. Four groups of sensors are required, one group per matrix array. The sensors are labeled ABRSV, BCRSV, CBRSV and DCRSV, and each group contains eight sensors.

The relay ground voltage sensors are sensors for monitoring the voltage on the ground leads for each of the four matrix arrays of the mark/test relay groups. When the ERS and ERG commands are true only one mark/test relay group per AB, BC, and DC link group is operated. The sensors provide means to check the performance of the mark/test relay ground gates, the address decoders and the actual mark/test relays. Four groups of sensors are required, one group per matrix array. The sensors are labeled ABRGV, BCRGV, CBRGV and DCRGV. Each group contains eight sensors.

The fault detection gate voltage sensors are sensors which monitor the voltage at the output of the matrix and hold path fault detection gates, in order to check the proper operation of these gates. Seven such sensors are required: AMGFV, BMGFV, CMGFV, and DMGFV sensors monitor the corresponding matrix fault detection gates; and ABTFV, BCTFV, and DCTFV sensors monitor the corresponding hold path fault detection gates.

Figure 27:
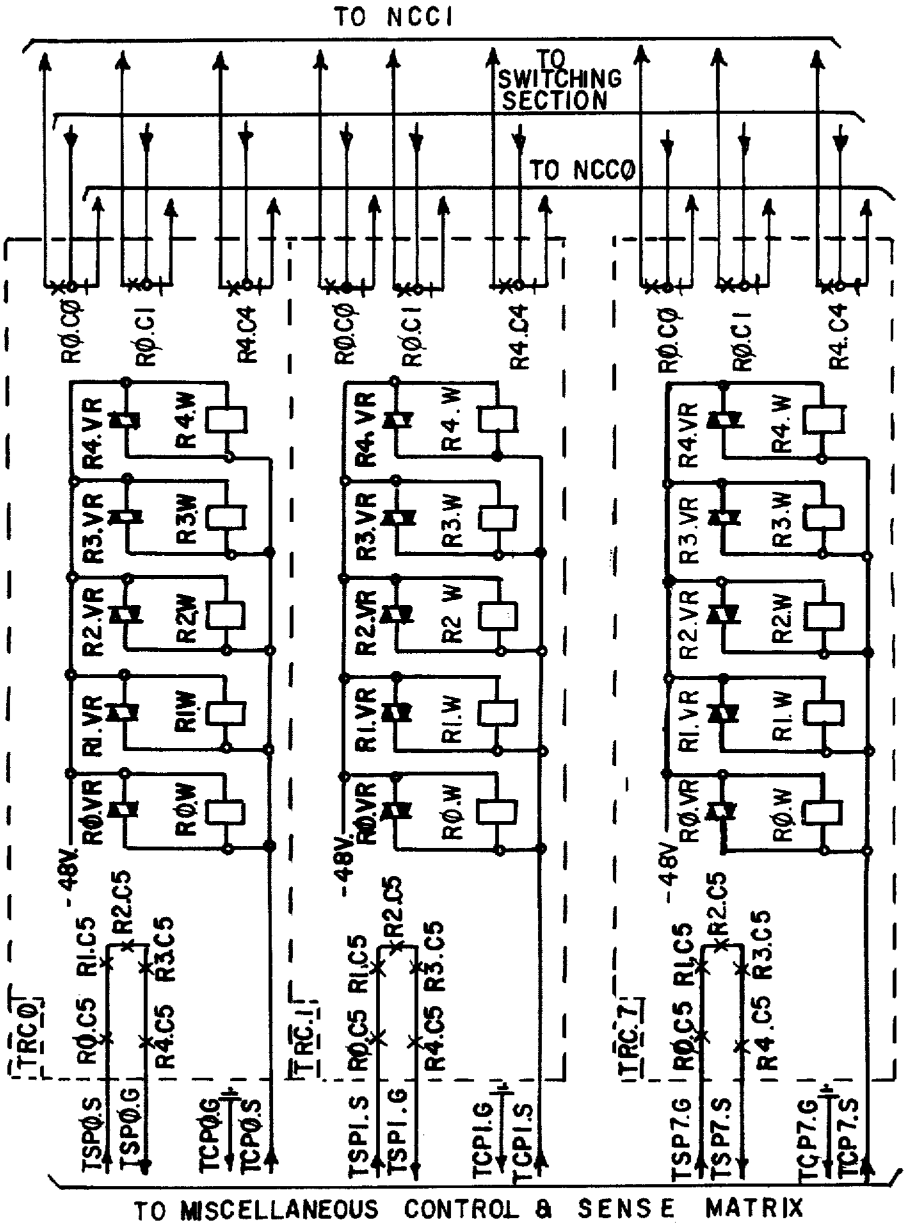

Considering now the transfer relay group NXR in greater detail with reference to FIGS. 26 and 27 of the drawings, the task of the NXR group is to connect, under program control, either one of the two NCC controllers to the switching section. A total of 184 leads are transferred.

The group NXR consists of eight transfer relay circuits, designated TRCØ through TRC7. Each TRC circuit is mounted on a printed wiring board containing five HQA relays RØ-R4. Five of the six transfer contacts belonging to each relay of each TRC circuit are available for use in the transfer function. A total of 200 transfer contacts are thus available, of which 184 are actually used.

On each TRC circuit, the make contact of the sixth transfer is wired in series with all other single make contacts from the other relays on that TRC printed circuit board. This series string forms a sense point.

Each of the eight relay boards is under control of its own individual electromechanical control point designated transfer control point TCPØ through TCP7. The performance of the transfer relays is monitored by eight SMP points which are connected to the eight series strings of make contacts from each board. The SMP points are designated transfer sense points TSPØ through TSP7.

The TSP points and the TCP points are located in the miscellaneous control and sense matrices.

Considering now the hold path battery disconnect circuit NBH, as mentioned previously, the NBH circuit is functionally a part of the audio test equipment. The NBH circuit, which is the only part of the audio test hardware to be collocated with the network units, consists of one TRC type circuit board per NU unit. Only two of the five HQA relays on the board are required for each NBH circuit: on the first relay, four break contacts are used, one contact for each hold path A-horizontal associated with a trunk grid audio test generator; on the second relay, four break contacts are used, one contact for each hold path A-horizontal associated with a trunk grid audio test detector.

All associated CMP points and SMP points are located in the miscellaneous control and sense matrices.

HOLD RELAY UNIT

Referring now to FIG. 5, the hold relay unit NHU includes all of the hold relays HR in the network complex. Each HR relay is under individual control of an electromechanical control matrix point, designated as a hold relay control point HCP.

The main task of a hold relay is to latch up a network unit hold path established by a network controller for as long as required. In addition it provides for dry switching of the audio contacts in switching section crosspoint assemblies.

Figure 28:
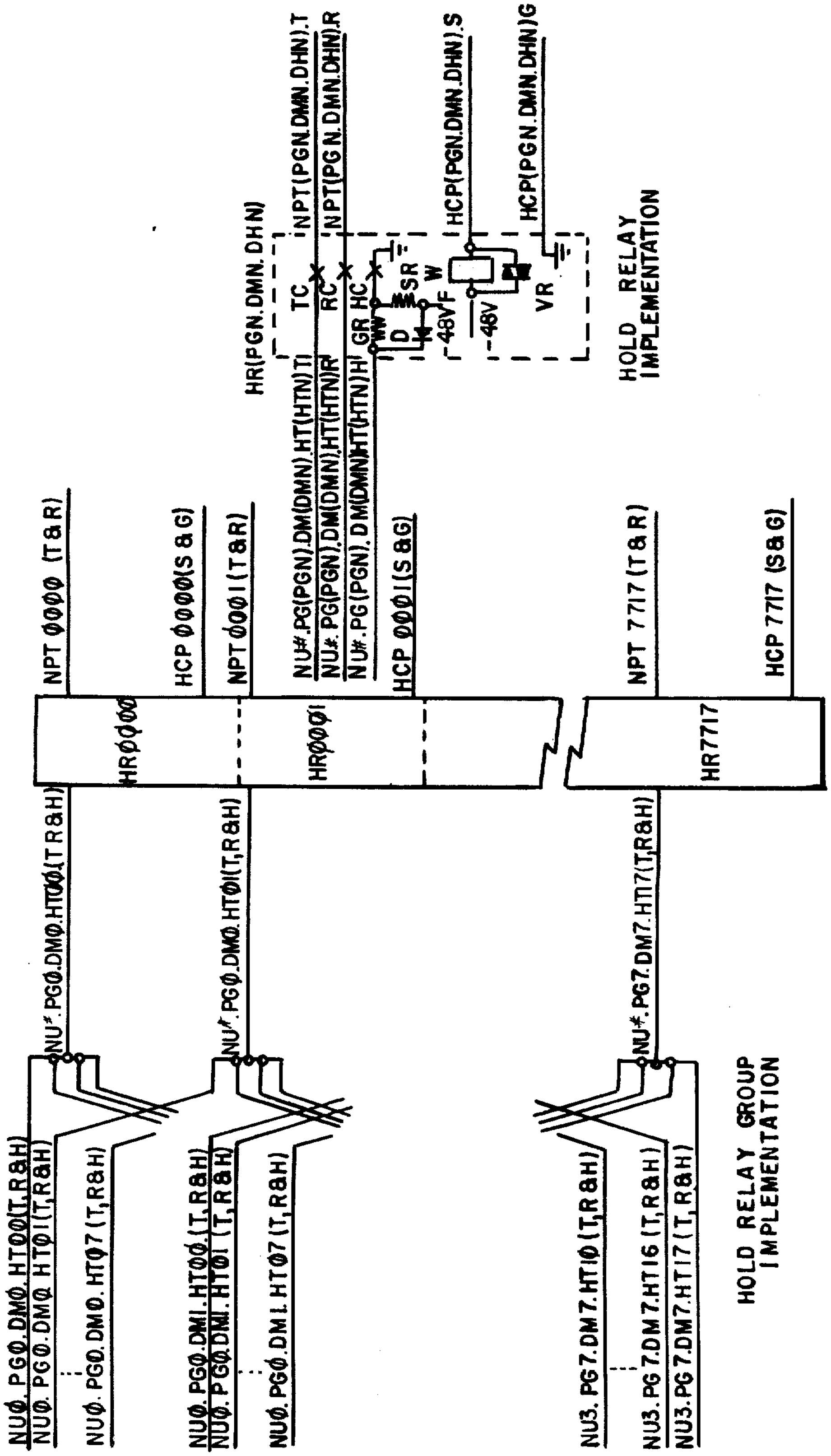

Referring now to FIG. 28, each terminal on the network side of the NHU unit is a multiple of all identically numbered D-matrix horizontals, indicated by: NU*.PG(PGN).DM(DMN).HT(HTN).

Each terminal on the position side of the NHU unit (which is associated with a dedicated terminal of a position or service circuit) is the actual network position terminal, indicated by:

NPT (NPTN) = NPT(PGN.DHN), where:

PGN ranges from Ø through 7.

DMN ranges from Ø through 7.

DHN ranges from Ø through 3 for a network complex with 265 NPT's.

DHN ranges from Ø through 7 for a network complex with 512 NPT's.

DHN ranges from ØØ through 13 for a network complex with 768 NPT's.

DHN ranges from ØØ through 17 for a network complex with 1024 NPT's.

Each NAM has an associated hold relay group NHG, which contains 128 HR relays. An NHU unit may contain a maximum of eight NHG groups designated NHGØ through NHG7. Therefore, there is provided a one-to-one relationship between the NHGN number and the NAMH number such that: NHGN = NAMN.

Depending upon the purpose for which the designation is to be used, the hold relay itself is identified in one of two ways. These relations are indicated in FIG. 31.

From a point of view external to the network complex, the hold relays are identified in terms of this one-to-one relationship to the position terminals. That is, since HRN=NPTN, the relation HR(HRN) = HR (PGN.DMN.DHN) is achieved. When viewed from the standpoint of a particular NHG group, foregoing relationship shown is not applicable, since only the number DMN is common to all NHGN number (see FIG. 31) The hold relays are defined in terms of their HCP relative location as one of the 32 bits in a control work. The HCP full identification is: NAM(NAWN.W (NAMWN.B (CMPN). The HR relays full identification is: NHG(NAMN).W (NAMWN) .B(CMPN).

Figure 31A:
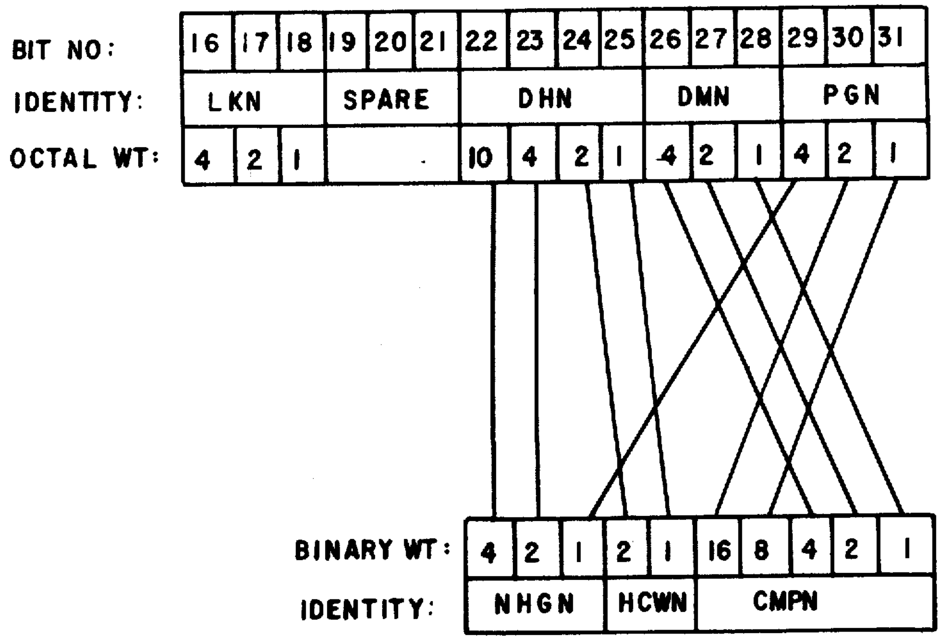

At the level of a given NHG group the HCP as well as its associated HR relay are identified by: W (NAMWN).B (CMPN). FIG. 31A indicates the method of converting the NPTN number (contained in the right half of NCWØ work) to the binary coded HCPN number. Refer to FIG. 31 for a more graphic illustration of these relationships.

Referring now to FIG. 28B, the hold relay HR is a reed relay with three form A contacts, of which two contacts TC and RC are used to switch the T and R leads. The remaining contact HC provides ground potential into the NU hold path upon operation of its hold relay control point HCP.

A pair of resistors SR and GR and a diode D are interconnected with the hold relay HC as shown in FIG. 28. The diode provides a shunt across the NU hold path. This shunt causes a delayed release of the crosspoint relays, with respect to the release of the HR relay, to fulfill the dry switching requirements of the reed capsules.

Resistors SR and GR limit current through the hold path, provide a negative voltage for use in maintenance routines, and supply a 48 volt charge to the cable capacitance at the D stage horizontal, reducing current transients through the matrix hold contacts when the matrix stages are pulled.

Figure 29:
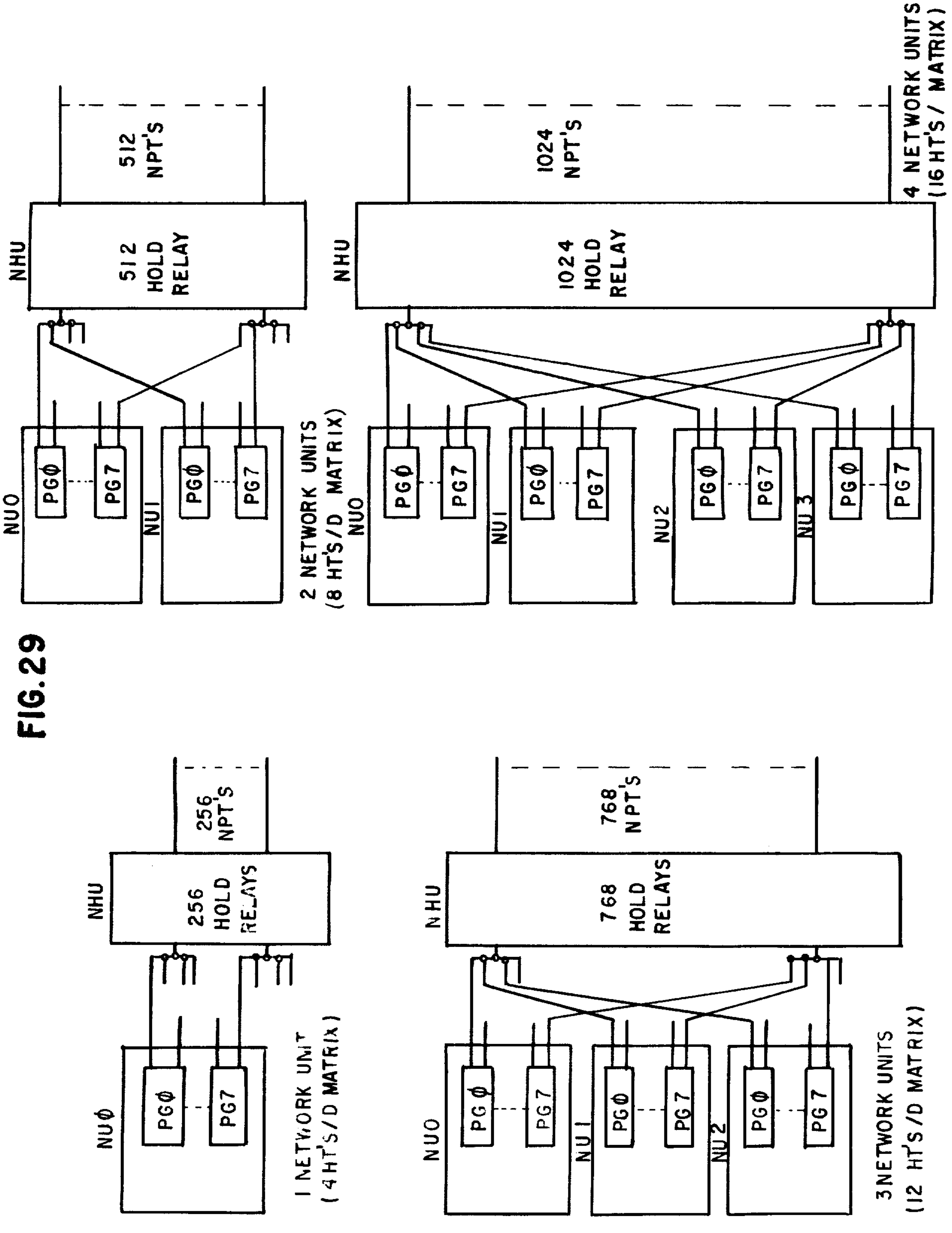
Figure 30:
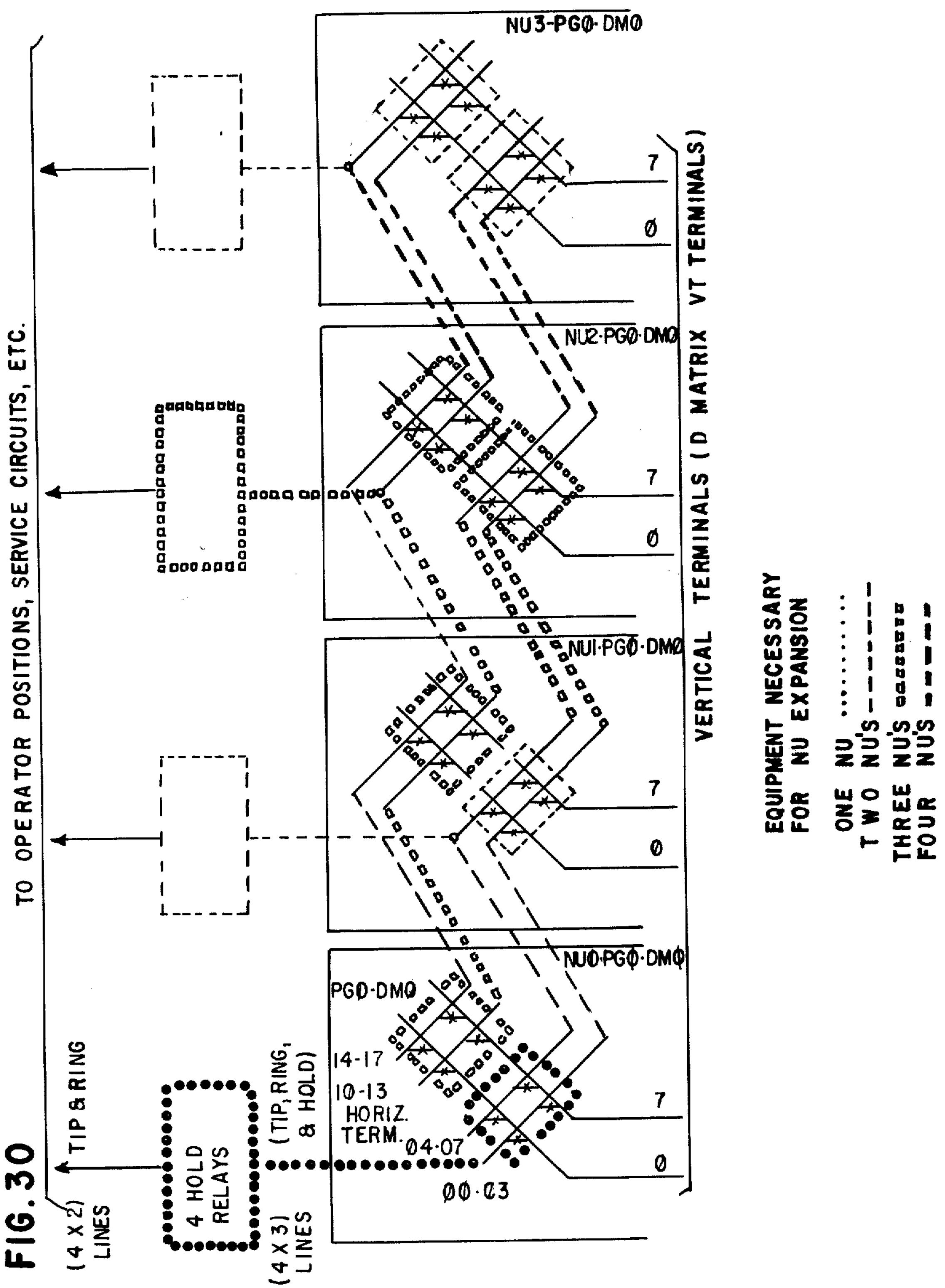

Considering now the manner in which the network complex of the present invention may, if desired, be expanded to accommodate additional traffic, with refe-renct to FIGS. 29 and 30, each NU unit of the network complex must be equipped with at least as many HT terminals as there are NPT terminals in a given installation. The following table shows the relation between the NPT terminals and the switching equipment required for four typical network complex sizes:

| Required Numbers of Switching Equipment | NPT Terminals Per Network Complex 256 | 512 | 768 | 1024 |
|---|---|---|---|---|
| Hold relay groups NHG | 2 | 4 | 6 | 8 |
| Hold relays HR | 256 | 512 | 768 | 1024 |
| Network units NU | 1 | 2 | 3 | 4 |

-continued

| Required Numbers of Switching Equipment | NPT Terminals Per Network Complex 256 | 512 | 768 | 1024 |
|---|---|---|---|---|
| D-matrices DM per NU | 64 | 64 | 64 | 64 |
| Horizontal terminals HT per DM, minimum | 4 | 8 | 12 | 16 |
| 8 × 8 matrix sub-assemblies per DM | 1 | 1 | 2 | 2 |
| Actual number of D matrix HT terminals provided per NU | 512 | 512 | 1024 | 1024 |

The table shows that in case 1 or 3 NU units are installed, all DM matrices have four spare HT terminals, because each matrix sub-assembly is equipped with eight HT terminals and eight VT terminals.

If the number of NPT terminals is in the network complex has to be increased, the following hardware additions are required:

a. Add an NU unit with the required number of HT terminals per DM matrix.

b. If the expansion is from two to three NU units, add an eight by eight matrix sub-assembly to all DM terminals of NU0 and NU1, so as to bring the maximum number of HT terminals per DM matrix from eight to 16.

c. Provide multiples between the 256 HR relays (included in the added NU unit) and the corresponding D matrix HT terminals of all NU units.

d. Provide a multiple between the already present HR relays and the corresponding D matrix HT terminals of the added NU unit.

What is claimed is:

1. In a communication switching system having a group of switching network units, each unit comprising at least two crosspoint matrix stages coupled by links, each network unit having a plurality of inlets and a plurality of outlets and having a plurality of switching devices for closing paths coupling inlets and outlets, each one of the devices having control means energizable for causing the paths to be closed, common control equipment for causing selectively the activation of said control means to establish paths through said network units, a network control arrangement comprising:

means coupling together corresponding ones of said control means of said matrix stages so that said corresponding ones of said control means can be energized simultaneously;

distributing means for selecting one of said control means to permit it to be activated; and switching means for coupling selectively each one of the control means of a selected network unit to said distributing means so that said distributing means can permit the selected control means to be activated;

testing means for checking selected switching devices;

sequence check control means coupled to said network units;

variable sequence translation means coupled to said network unit means;

whereby said testing means may be operated in any sequence and any device may be operated and checked in any desired order, at any time, said testing means comprising;

hold path release verification means comprising, hold path link test sensors coupled between each of said matrix stages;

test voltage insertion means coupled between each of said matrix stages; and hold path link test sensor verification means coupled between each of said matrix stages;

simultaneous mark and link test control means comprising, mark means coupled to each of said control means;

link test means coupled between each of said switching matrix stages;

mark and link test sensor means coupled to said mark means and said link test means; and sensor verification gate means coupled to said mark means and said link test means;

circuit pull verification means coupled to each of said matrix stages comprising, pull test sensor means coupled to said circuit pull verification means; and sensor verification gate means coupled to said circuit pull verification means.

* * * * *